United States Patent
Brandhorst, Jr. et al.

(10) Patent No.: US 10,640,711 B2
(45) Date of Patent: May 5, 2020

(54) MULTISTAGE THERMOLYSIS METHOD FOR SAFE AND EFFICIENT CONVERSION OF TREATED WOOD WASTE SOURCES

(71) Applicant: CHZ TECHNOLOGIES, LLC, Austintown, OH (US)

(72) Inventors: Henry W. Brandhorst, Jr., Auburn, AL (US); Ullrich H. Engel, Camberg (DE); Charles T. Ludwig, Auburn, AL (US); Ernest J. Zavoral, Sr., Canfield, OH (US)

(73) Assignee: CHZ Technologies, LLC, Austintown, OH (US)

( * ) Notice: Subject to any disclaimer, the term of this patent is extended or adjusted under 35 U.S.C. 154(b) by 0 days.

(21) Appl. No.: 16/432,215

(22) Filed: Jun. 5, 2019

(65) Prior Publication Data
US 2019/0367814 A1 Dec. 5, 2019

Related U.S. Application Data

(60) Provisional application No. 62/680,922, filed on Jun. 5, 2018.

(51) Int. Cl.
*C10L 5/46* (2006.01)
*C10B 53/02* (2006.01)
(Continued)

(52) U.S. Cl.
CPC .............. *C10B 53/02* (2013.01); *C08J 11/14* (2013.01); *C10B 47/44* (2013.01); *C10B 57/02* (2013.01);
(Continued)

(58) Field of Classification Search
CPC ...... Y02P 10/214; Y02P 20/143; Y02P 30/20; Y02P 10/22; Y02P 10/228; Y02P 20/582;
(Continued)

(56) References Cited

U.S. PATENT DOCUMENTS 3,825,464 A   7/1974   Crowley
3,899,323 A   8/1975   Van Slyke
(Continued)

FOREIGN PATENT DOCUMENTS

AU   199883370 B2   12/1998
CA   2133222        3/1993
(Continued)

OTHER PUBLICATIONS

Webb et al., "the Tie Guide", Handbook for the Commercial Timbers Used by the Railroad Industry, 100 pages, 2016.
(Continued)

*Primary Examiner* — Sharon Pregler
(74) *Attorney, Agent, or Firm* — McKee, Voorhees & Sease, PLC

(57) ABSTRACT

Clean, safe and efficient methods, systems, and processes for utilizing thermolysis methods to processes to convert various treated wood sources, such as rail road ties, cross ties, RR crossing roadways, telephone poles, utility poles, cross arm members, bridge timbers, decking, walkways, dock timbers and wharf pilings, lake and ocean pier/pilings, landscaping timbers and edging, treated outdoor engineering structural and other reinforced wood composites, and other end-of-life treated wood materials, into a Clean Fuel Gas and Biochar are disclosed. The invention processes the treated wood sources using thermolysis methods to destroy and/or separate halogen and other dangerous components to provide a Clean Fuel Gas and Biochar source.

18 Claims, 10 Drawing Sheets

(51) Int. Cl.
*C10B 47/44* (2006.01)
*C08J 11/14* (2006.01)
*C10B 57/02* (2006.01)
*C10L 5/44* (2006.01)

(52) U.S. Cl.
CPC ....... *C10L 5/447* (2013.01); *C10L 2200/0469* (2013.01); *C10L 2290/02* (2013.01); *C10L 2290/06* (2013.01); *C10L 2290/10* (2013.01)

(58) Field of Classification Search
CPC ........ Y02P 40/55; Y02P 40/57; Y02P 70/613; Y02P 10/216; Y02P 10/234; Y02P 10/236; Y02P 40/535; Y02P 40/58; C07C 2529/61; C07C 5/226; C07C 5/415; B01J 29/50; B01J 29/60; B01J 29/62; B01J 29/70; B01J 29/7011; B01J 29/80; B01J 8/087; B01J 8/10; B01J 19/28; C01B 2203/0216; C01B 2203/0277; C01B 2203/0283; C01B 2203/0405; C01B 2203/0415; C01B 2203/0475; C01B 2203/048; C01B 2203/049; C01B 2203/0495; C01B 2203/062; C01B 2203/147; C01B 2203/84; C01B 2203/86; C01B 3/50
See application file for complete search history.

(56) References Cited

U.S. PATENT DOCUMENTS

| | | |
|---|---|---|
| 4,159,241 A | 6/1979 | Simo |
| 4,317,800 A | 3/1982 | Sloterdijk et al. |
| 4,874,486 A | 10/1989 | Hanulik |
| 5,045,177 A | 9/1991 | Cooper et al. |
| 5,139,203 A | 8/1992 | Alavi |
| 5,427,650 A | 6/1995 | Holloway |
| 5,771,822 A | 6/1998 | Rizzon |
| 6,084,139 A | 7/2000 | Van Der Glessen et al. |
| 6,178,899 B1 | 1/2001 | Kaneko et al. |
| 8,138,232 B2 | 3/2012 | Maeurer et al. |
| 8,188,329 B2 | 5/2012 | Nowottny et al. |
| 8,308,843 B2 | 11/2012 | Wu |
| 8,377,382 B2 | 2/2013 | Nowottny et al. |
| 8,419,902 B2 | 4/2013 | Feerer et al. |
| 8,800,775 B2 | 8/2014 | Thomas et al. |
| 8,864,057 B2 | 10/2014 | Bork et al. |
| 8,864,946 B2 | 10/2014 | Scheirs |
| 8,915,199 B2 | 12/2014 | Bohlig et al. |
| 9,816,033 B2* | 11/2017 | Brandhorst, Jr. ........ C10K 1/08 |
| 2002/0117388 A1 | 8/2002 | Denison |
| 2008/0028889 A1 | 2/2008 | Irizarry-Rivera et al. |
| 2009/0020052 A1 | 1/2009 | Becchetti et al. |
| 2009/0062581 A1 | 3/2009 | Appel et al. |
| 2013/0174694 A1 | 7/2013 | Xu |
| 2013/0256113 A1 | 10/2013 | Tumiatti et al. |
| 2014/0069798 A1 | 3/2014 | Hayward et al. |
| 2014/0090518 A1 | 4/2014 | Stumpf et al. |
| 2014/0182194 A1 | 7/2014 | Unger et al. |

FOREIGN PATENT DOCUMENTS

| | | |
|---|---|---|
| CH | 5678131 A5 | 7/1991 |
| CN | 101444784 A | 6/2009 |
| CN | 101612628 A | 12/2009 |
| CN | 101767104 A | 7/2010 |
| CN | 101992203 A | 3/2011 |
| CN | 101444784 B | 5/2011 |
| CN | 102061008 A | 5/2011 |
| CN | 201855831 U | 6/2011 |
| CN | 102172600 A | 9/2011 |
| CN | 102218439 A | 10/2011 |
| CN | 102219922 A | 10/2011 |
| CN | 102350429 A | 2/2012 |
| CN | 202207705 U | 5/2012 |
| CN | 101992203 B | 4/2013 |
| CN | 102172600 B | 4/2013 |
| CN | 103831287 A | 6/2014 |
| CN | 103846272 A | 6/2014 |
| CN | 103846273 A | 6/2014 |
| CN | 203678829 U | 7/2014 |
| CN | 104384168 A | 3/2015 |
| CN | 104479756 A | 4/2015 |
| GB | 1297734 | 11/1972 |
| IN | 02674 A | 6/2015 |
| KR | 20070077114 A | 2/2009 |
| KR | 20090036003 A | 6/2009 |
| KR | 20120055756 A | 6/2012 |
| KR | 20140089905 A | 7/2014 |
| KR | 20150014238 A | 2/2015 |
| TW | 201028224 A1 | 8/2010 |
| WO | 900700 A1 | 1/1990 |
| WO | 2014167139 A2 | 10/2014 |
| WO | 2015024102 A1 | 2/2015 |
| WO | 2015090477 A1 | 6/2015 |

OTHER PUBLICATIONS

Nestler, F.H. Max, "The Characterization of Wood-Preserving Creosote by Physical and Chemical Methods of Analysis", USDA Forest Service Research Paper, 33 pages, 1974.

Wilson et al., "Implications and Risks of Potential Dioxin Presence in Biochar", IBI White Paper, 11 pages, Apr. 2012.

Aliquippa Holdings, Inc., "Latest Waste-to-Energy Technology", dated Apr. 26, 2015, 2 pages, last accessed on Feb. 23, 2017.

Cui et al., "Metallurgical recovery fo metals from electronic waste: A review", Journal of Hazardous Materials, vol. 158, pp. 228-256, Feb. 4, 2008.

Demarco et al., "Pyrolysis of electrical and electronic wastes", J. Anal. Appl. Pyrolysis, vol. 82, pp. 179-183, Mar. 14, 2008.

Diaz et al. "Comprehensiver Process for the Recovery of Value and Critical Materials from Electronic Waste" Manuscript, 38 pages Mar. 22, 2016.

Elliott, Bobby, "The FPD era: Numbers, challenges and success strategies", E-Scrao News, Power Point presentation, 30 pages, 2015.

"Major Processes for Recovery of Precious Metals from E-Waste", E-Waste Processing Write up, 3 pages, Apr. 25, 2016.

Guidelines for Post Consumer Recycled Content in Plastic Packaging; GreenBlue, Aug. 24, 2014, http://web.archive.org/web/*/http://www.sustainablepackaging.org/uploads/resources/spc_pcr_plastic_packaging.pdf; p. 2, col. 2; p. 8, col. 2, accessed Feb. 21, 2017.

He et al., "WEEE recovery strategies and the WEEE treatment status in China", Journal of Hazardous Materials, vol. B136, pp. 502-512, Apr. 18, 2006.

Kunststoff-Und Umwelttechnik Gmbh, PCT/DE2012/100057, filed Mar. 9, 2012, The International Search Report and the Written Opinion of the International Searching Authority, dated Oct. 24, 2012.

CHZ Technologies, LLC, in connection with PCT/US2016/067091 filed Dec. 16, 2016, "The International Search Report and the Written Opinion of the International Searching Authority, or the Declaration", 11 pages, dated Mar. 23, 2017.

Jamakanga et al., "Feasibility Study for Recovering Precious Metals from E-Waste", Harare Institute of Technology, 74 pages. 2014.

Jie et al., "Product characterization of waste printed circuit board by pyrolysis", J. Anal. Appl. Pyrolysis, vol. 83, pp. 185-189, Aug. 10, 2008.

Kang et al., "Electronic waste recycling: A review of U.S. infrastructure and technology options", Resources, Conservation and Recycling, vol. 45, pp. 368-400, Jun. 2, 2005.

Luda, Maria, "Recycling fo Printed Circuit Boards", Integrated Waste Management, vol. 2, pp. 285-299, Aug. 1, 2011.

Luyima, Alex, "Recycling of electronic waste: printed wiring boards", Doctoral Dissertations, Curtis Laws Wilson Library, 156 pages, Jun. 1, 2013.

(56) References Cited

OTHER PUBLICATIONS

Mankhand et al., "Pyrolysis of Printed Circuit Boards", International Journal of Metallurgical Engineering, vol. 1, No. 6, pp. 102-107, Jan. 1, 2012.
Mitchell, Carey, "Are There Real Differences Between Type 6 and 6,6 Nylons?", The Digest, 4 pages, downloaded May 13, 2016.
Molto, J., "Pyrolysis and combustion of electronic wastes", J. Anal. Appl. Pyrolysis, vol. 84, pp. 68-78, Oct. 22, 2008.
Pakpahan et al., "Effect of Temperature on the Formation and Degradation of Polycyclic Aromatic Hydrocarbons," International Conference on Emerging Technologies in Environmental Science and Engineering, Aligarh, India, 6 pages, Oct. 26, 2009.
"Printed Circuit Boards", Mechanical Treatment Concepts, URT Umweldt and Recyclingtechnik GmbH, 2 pages. Sep. 21, 2015.
Quan et al., "Combustion and Pyrolysis and Electronic Waste: Thermogravimetric Analysis and Kinetic Model", Procedia Environmental Sciences, vol. 18, pp. 776-782, Jan. 1, 2013.
Sun et al., "Kinetic Study of the Pyrolysis of Waste Printed Circuit Boards Subject to Conventional and Microwave Heating", Energies, vol. 5, pp. 3295-3306, Aug. 24, 2012.
SWICOFil, "Polytrimethylene terephthalate PTT yarns-Corterra", 5 pages, last accessed on Jan. 18, 2016.
Tomar et al., "Electricity from Waste—Bibliographic Survey", Sustainable Energy, vol. 2, No. 3, pp. 108-115, May 20, 2014.
Watson et al., "Toxic Transformers: a review of the hazards of brominated & chlorinated substances in electrical and electronic equipment", Greenpeace Research Laboratories Technical Note, 48 pages, Jan. 2010.
White et al., "Patent Landscape Report on E-Waste Recycling Technologies", WIPO, 145 pages, Nov. 2013.
Yang et al., "Pyrolysis and dehalogenation of plastics from waste electrical and electronic equipment (WEEE): A review", Waste Management, vol. 33, pp. 462-473, 2013.
Zhou et al., "Polycyclic Aromatic Hydrocarbon Formation from the Pyrolysis/Gasification of Lignin at Different Reaction Conditions," Energy & Fuels, vol. 28, pp. 6371-6379, Sep. 17, 2014.
CHZ Technologies, LLC, issued in connection with PCT/US2016/66856 filed Dec. 15, 2016, "The International Search Report and the Written Opinion of the International Searching Authority, or the Declaration", 18 pages, dated Mar. 14, 2017.

* cited by examiner

MULTISTAGE THERMOLYSIS METHOD FOR SAFE AND EFFICIENT CONVERSION OF TREATED WOOD WASTE SOURCES

CROSS-REFERENCE TO RELATED APPLICATIONS

This application claims priority under 35 U.S.C. § 119 to provisional application Ser. No. 62/680,922, filed Jun. 5, 2018, herein incorporated by reference in its entirety.

FIELD OF THE INVENTION

The invention relates to clean, safe and efficient methods, systems and processes for utilizing thermolysis methods to process various treated wood waste sources and convert the waste sources into a Clean Fuel Gas and Biochar. Thermolysis provides an advanced pyrolysis methodology for heating and converting treated wood waste sources as disclosed herein. In a particular aspect, the methods process treated wood sources, such as, for example, railroad ties, telephone poles, and other wood treated with chemicals, such as preservatives, to effectively separate, neutralize and/or destroy halogens and other hazardous components in the treated wood sources to provide a Clean Fuel Gas and Biochar.

BACKGROUND OF THE INVENTION

The global markets for disposal and/or repurposing of treated wood waste sources continues to increase and many landfills are not suited to accept the treated wood sources due to environmental concerns and/or the landfills are reaching their capacity for such waste sources. For example, in the U.S. alone approximately 20 million railroad ties are replaced annually and approximately 5 to 8 million of these railroad ties are landfilled or simply left onsite as environmental waste, representing approximately 500 tons of treated wood waste source available for processing. Similarly, about 4 million utility/telephone poles are replaced annually in the U.S. These end-of-life poles have both chlorine and arsenic-containing preservatives that make their disposal difficult. Thus, they are simply left to rot in storage facilities or other locations.

When disposal of treated wood waste sources is not practical, recycling of the waste is the next best option. When landfilling and/or recycling presents difficulties and/or are not economically feasible incineration remain the primary option for disposal of the waste source. However, incineration is known to result in the generation and atmospheric release of toxic compounds and increases $CO_2$ emissions. This is a result of the chemicals, such as preservatives, that are used to treat the wood sources, such as creosote, chlorinated phenols, arsenic-containing preservatives such as chromium arsenate and chromated copper arsenate, and other toxic chemicals.

There are various forms of treated wood sources that require landfilling, recycling and/or conventional incinerating in the U.S. and worldwide. These include for example, railroad ties, cross ties, RR crossing roadways, telephone poles, utility poles, cross arm members, bridge timbers, decking, walkways, dock timbers and wharf pilings, lake and ocean pier/pilings, landscaping timbers and edging, treated outdoor engineering structural and other reinforced wood composites, and other end-of-life treated wood materials. Still further treated wood waste sources abound in need for efficient processing, recycling and/or disposal and can be processed according to the present invention as one skilled in the art will appreciate.

As a result, there remains a need for efficient processing of a variety of treated wood waste sources. Accordingly, it is an objective of the claimed invention to solve the long-standing problem and need in the art for efficient methods for processing of treated wood waste sources.

A further object of the invention is to provide methods, systems, and/or processes for utilizing thermolysis methods to safely and efficiently convert such waste sources to a Clean Fuel Gas and Biochar without the generation of (and beneficially the removal of) toxic byproducts, including creosote and small molecules, including chlorinated phenols and polymers, commonly used in these waste input streams. Toxic byproducts further include, for example, VOCs, aromatics and polycyclic aromatic hydrocarbons (PAHs), dioxins and furans, including halogenated dibenzodioxins and halogenated dibenzofurans, biphenyls, pyrenes, cadmium, lead, antimony, arsenic, beryllium, chlorofluorocarbons (CFCs), mercury, nickel and other organic compounds. As a result, the methods, systems, and/or processes of the invention meet even the most rigid environmental standards.

A further object of the invention is to provide methods, systems, and/or processes for utilizing thermolysis methods to safely and efficiently convert various waste sources to a Clean Fuel Gas and Biochar. In particular, the generation of a Clean Fuel Gas provides a desirable waste-to-energy pathway from a previously unutilized waste source through the recycling of tars and oils to generate Clean Fuel Gas to thereby reuse the energy that went into the original fabrication. In a further application, the generation of the Biochar (can also be referred to as coke) is suitable for further use as a soil amendment, water treatment, and/or various applications. A further object of the invention is to utilize thermolysis methods to destroy (and beneficially not generate any additional) toxic halogenated organic compounds or hazardous inorganic chemicals present in certain components of the waste sources.

A further object of the invention is to utilize thermolysis methods to generate clean, useable fuel gas sources substantially-free or free of halogenated organic compounds (including VOCs).

Other objects, advantages and features of the present invention will become apparent from the following specification taken in conjunction with the accompanying drawings.

BRIEF SUMMARY OF THE INVENTION

An advantage of the invention is the clean and efficient methods, systems, and/or processes for Thermolysis methods to safely and efficiently convert treated wood waste sources into clean energy, namely a Clean Fuel Gas and Biochar. It is a further advantage of the present invention that the waste sources are converted by destroying toxic halogenated organic and hydrocarbon compounds present therein, and clean, useable fuel gas sources substantially-free or free of creosote components and other chemicals, including for example halogenated organic compounds, hydrocarbon compounds, and the like. Moreover, Biochar is produced that is substantially-free or free of the creosote components and other chemicals, including for example halogenated organic compounds, hydrocarbon compounds, and/or organic preservatives. It is a further advantage that the Biochar is substantially-free or free of inorganic materials, such as arsenic salts and borate compounds found in the waste source.

Figure 1:
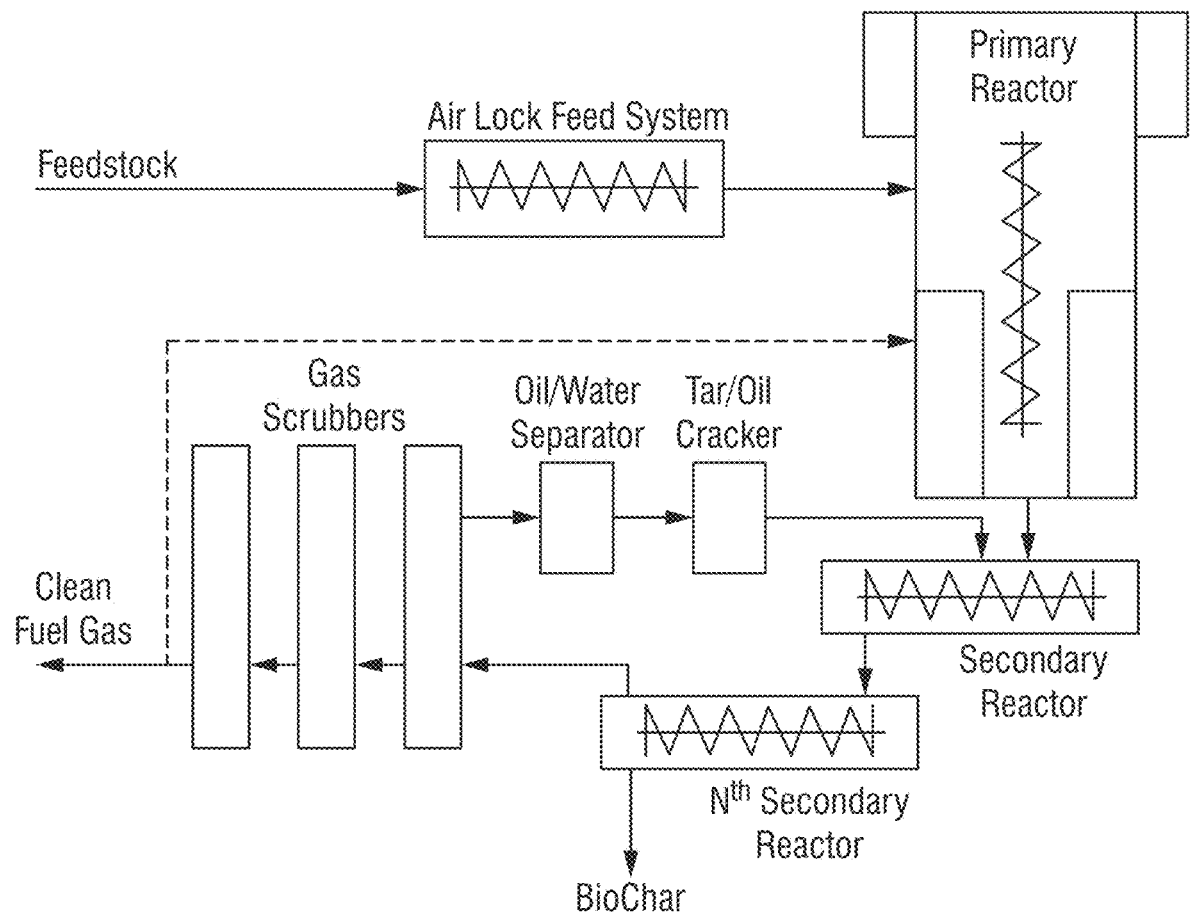
FIGS. 1-3 show exemplary process diagrams for the methods, systems, and/or processes of the invention.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments of this invention are not limited to particular methods, systems, and/or processes for thermolysis methods to safely and efficiently convert treated wood waste sources, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "substantially-free," as used herein may refer to a minimal amount of a non-desirable and/or toxic component in a material, such as a Biochar generated by the methods, processes and systems of the invention. In an aspect, a material is substantially-free of a defined component if it contains less than a detectable amount of the defined component, or less than about 10 parts per billion (ppb), or more preferably less than about 1 ppb. In an embodiment, Biochar and fuel gas generated according to the processing of the waste is substantially-free of toxins, including halogens, having less than about the detection limit of about 10 ppb, or more preferably less than about 1 ppb of the toxin, including halogens. For toxic and/or hazardous materials, free represents an amount below the detection limit of the appropriate material within experimental error. In an aspect of the invention the Biochar and Fuel Gas Source generated according to the processing of woods, plastics, and other polymeric material waste sources free of toxins, indicating that there is a non-detectable amount of toxins in the measured source.

The term "substantially-free," as used herein referring to oxygen in the thermolysis methods refers to a minimal amount of oxygen or air. In an aspect, a system is substantially-free of oxygen if it contains less than about 4 wt-%, and preferably less than about 2 wt-%.

The term "thermolysis" as used herein is generally referred to as a thermal-chemical decomposition conversion process employing heat to an input source in need of conversion to a Clean Fuel Gas and Biochar. Thermolysis refers generally to thermal-chemical decomposition of organic materials at temperatures >300° C. and in some instances in the absence of external oxygen to form gases, tars, and oils and Biochars that can be used as chemical feedstocks or fuels. Tars and oils represent groups of volatile organic compounds, viscous liquids, paraffins, waxes, aromatics, aliphatics, fats and other petrochemical based organic mixtures for example. The thermolysis methods disclosed according to the present invention are an advancement over conventional pyrolysis and/or thermolysis methods, which employ fire or a heat source and include an oil as an output. As described herein according to the invention no oil is generated as an output of the thermolysis methods of the present invention. As disclosed in further detail herein, the present thermolysis methods employ at least a reprocessing of any tars and oils. Based on at least these distinctions between the thermal conversion methods, the terms thermolysis and pyrolysis are not synonymous, as thermolysis provides various beneficial improvements not previously achieved by pyrolysis methods and/or conventional thermolysis methods.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, and/or compositions of the present invention may comprise, consist essentially of, or consist of the components and ingredients of the present invention as well as other ingredients described herein. As used herein, "consisting essentially of" means that the methods, systems, and/or compositions may include additional steps, components or ingredients, but only if the additional steps, components or ingredients do not materially alter the basic and novel characteristics of the claimed methods, processes and/or systems.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

The methods, systems, and/or processes of the present invention relate to thermolysis methods to safely and efficiently convert various treated wood waste sources to a Clean Fuel Gas and Biochar. Beneficially, the methods, systems, and/or processes of the present invention provide significant and unexpected advances beyond conventional thermolysis methods. For example, conventional combustion processes which burn treated wood waste sources are highly unpredictable and difficult to control and result in significant environmental emissions and other forms of pollution if the char source generated is used in other applications. Although advancements in thermolysis have been made in the prior art, the present invention beneficially exceeds the capabilities of known thermolysis methods in converting treated wood waste sources into valuable outputs which beneficially destroy (and do not generate any new) creosote chemicals and other toxic halogenated organic compounds present in treated wood waste sources. Moreover, the thermolysis methods of the invention include the use of multiple reactors, reinjection and cracking of any and all tars and oils that are created. As a further benefit, the methods, systems, and/or processes of the present invention generate clean, useable fuel gas sources substantially-free or free of any halogenated organic compounds. Notably, the methods, systems, and/or processes of the present invention do not simply reduce the amounts of halogenated compounds and other toxins that may be found in treated wood waste sources, instead these are removed (with no additional generation) from the treated waste sources while further providing the useful and valuable outputs of the invention (e.g. fuel gas source and Biochar) defined further herein.

Treated Wood Waste Sources

The methods, systems, and/or processes of the present invention relate to novel processes using thermolysis methods to safely and efficiently convert various treated wood waste sources, into Fuel Gas Source and Biochar. Applications of use thereof are also provided. As referred to herein, the "treated wood waste sources" refers to wood that has been chemically-treated, such as with preservatives to enhance durability and/or service life of a wood product due to its cellulosic nature subject to decay. Chemical treatments can be applied in several ways, such as preservative solutions or pressure treatment. Exemplary methods are disclosed for example in *The Tie Guide: Handbook for Commercial Timbers Used by the Railroad Industry*, 2016, which is herein incorporated by reference in its entirety.

Examples of treated wood waste sources include, but are not limited to railroad ties, cross ties, RR crossing roadways, telephone poles, utility poles, cross arm members, bridge timbers, decking, walkways, dock timbers and wharf pilings, lake and ocean pier/pilings, landscaping timbers and edging, treated outdoor engineering structural and other reinforced wood composites, and other end-of-life treated wood materials. The treated wood can be comprised of several types of wood, including for example mixed hardwood and softwood species, such as oak, pine, fir, poplar, maple, ash, elm, birch, hickory, etc. The treated wood can be comprised of treated outdoor engineering structural and other reinforced wood composites as well, including for example glue-laminated lumber and fiber-reinforced laminated products.

As referred to herein, treated wood waste sources may include metal or other components in addition to the wood and chemical components. For example, railroad ties may include metal S-bands, steel spikes other biological material on the ties as would be found in the applicable application of use of the treated wood waste source. Beneficially, the methods of the invention can process all components of the treated wood waste source without requiring a first step to remove other components from the wood.

In an aspect, treated wood sources can have up to 20 wt-% or greater, or even 25 wt-% or greater chemical components with the remainder comprising wood. The wood can be treated with various chemical components to provide preservative effects for its applications of use. Chemical components commonly include organic and inorganic compounds, such as creosote, pentachlorophenol (PCP), copper naphthenate, ammoniacal copper zinc arsenate, mixtures of coal tar oils (including heavy petroleum oil), borates, copper zinc chromium or arsenic-containing preservatives, aromatic compounds including chlorinated phenols (e.g. Cl-phenol), arsenic salts (e.g. Cr—Cu-arsenate (CCA)), nitrides (e.g. CuN) other salts, and the like. In an exemplary embodiment, the toxic compounds comprise pentachlorophenol (PCP), copper naphthenate, ammoniacal copper zinc arsenate, mixtures of coal tar oils, borate compounds, aromatic compounds, arsenic salts, nitrides or other salts, halogenated dibenzodioxins, halogenated dibenzofurans, biphenyls, pyrenes, arsenic, chlorofluorocarbons, or a combination thereof.

Various additional chemical preservatives can be included in the treated wood waste source, including for example materials and compounds disclosed at https://www.epa.gov/ingredients-used-pesticide-products/overview-wood-preservative-chemicals, which is incorporated by reference herein.

Creosote refers to a mixture that can include more than 100 aromatic compounds, including highly toxic aromatic components that require destruction in order to safely recycle and/or reuse any portion of the treated wood source. Exemplary compounds present in creosote are shown in Table 1.

TABLE 1

| Compound | Formula | Boil Pt. |
|---|---|---|
| Coumarone | $C_8H_6O$ | 173-175 |
| 1,2,3-Trimethylbenzene | $C_9H_{12}$ | 176.1 |
| Cymene | $C_{10}H_{14}$ | 177 |
| Hydrindene | $C_9H_{10}$ | 178 |
| Phenol | $C_6H_6O$ | 181 |

TABLE 1-continued

| Compound | Formula | Boil Pt. |
|---|---|---|
| Indene | $C_9H_8$ | 182 |
| Aniline | $C_6H_7N$ | 184 |
| 3,4-Dimenthylethylbenzene | $C_{10}H_{14}$ | 189 |
| Ammonium thiocyanate | $NH_4SCN$ | d.190 |
| 6-Methylcoumarone | $C_9H_8O$ | 190-191 |
| O-Cresol | $C_7H_8O$ | 190-191 |
| Benzonitrile | $C_7H_5N$ | 191 |
| 3 or 5-Methylcoumarone | $C_9H_8O$ | 195-196 |
| n-Undecane | $C_{11}H_{24}$ | 195.8 |
| Durene (1,2,4,5-tetramethylbenzene) | $C_{10}H_{14}$ | 196 |
| 4-Methylcoumarone | $C_9H_8O$ | 197-199 |
| Isodurene (1,2,3,5-tetramethylbenzene) | $C_{10}H_{14}$ | 198 |
| p-Toluidine | $C_7H_9N$ | 200.4 |
| o-Toluidine | $C_7H_9N$ | 200.7 |
| p-Cresol | $C_7H_8O$ | 201 |
| Acetophenone | $C_8H_8O$ | 202 |
| m-Cresol | $C_7H_8O$ | 202 |
| m-Toluidine | $C_7H_9N$ | 203.3 |
| 4-Methylindene | $C_{10}H_{10}$ | 205 |
| Tetrahydronaphthalene | $C_{10}H_{12}$ | 206.8 |
| 2,4-Xylenol | $C_8H_{10}O$ | 209 |
| 2,6-Xylenol | $C_8H_{10}O$ | 211.2 |
| 2,5-Xylenol | $C_8H_{10}O$ | 211.5 |
| 2,4-Xylidine | $C_8H_{11}N$ | 212 |
| m-Ethylphenol | $C_8H_{10}O$ | 214 |
| 2,5-Xylidine | $C_8H_{11}N$ | 215 |
| p-Ethylphenol | $C_8H_{10}O$ | 218 |
| Naphthalene | $C_{10}H_8$ | 218 |
| 2,3-Xylenol | $C_8H_{10}O$ | 218 |
| 3,5-Xylenol | $C_8H_{10}O$ | 219.5 |
| 3,5-Xylidine | $C_8H_{11}N$ | 220-221 |
| 3,6-Dimethylcoumarone | $C_{10}H_{10}O$ | 220-222 |
| 4,5-Dimethylcoumarone | $C_{10}H_{10}O$ | 220-222 |
| 4,6-Dimethylcoumarone | $C_{10}H_{10}O$ | 220-222 |
| Thionaphthene | $C_8H_6S$ | 222 |
| 2,3-Xylidine | $C_8H_{11}N$ | 223 |
| 3,4-Xylenol | $C_8H_{10}O$ | 225 |
| Dimethylindene | $C_{11}H_{12}$ | 225-230 |
| Pseudocumenol (2,4,5-trimethylphenol) | $C_9H_{12}O$ | 232 |
| 3-Ethyl-5-methylphenol | $C_9H_{12}O$ | 232.5-234.5 |
| 2,3,4,5-Tetramethylpyridine | $C_9H_{13}N$ | 233 |
| Isopseudocumenol (2,3,5-trimethylphenol) | $C_9H_{12}O$ | 233 |
| Quinoline (leucoline) | $C_9H_7N$ | 238 |
| 7-Hydroxycoumarone | $C_8H_6O_2$ | 240 |
| Methylthionaphthene | $C_9H_9S$ | 240-245 |
| 2-Methylnaphthalene | $C_{11}H_{10}$ | 241.14 |
| Isoquinoline | $C_9H_7N$ | 243.25 |
| 1-Methylnaphthalene | $C_{11}H_{10}$ | 244.78 |
| 4-Hydroxyhydrindene | $C_9H_{10}O$ | 245 |
| 2-Methylquinoline | $C_{10}H_9N$ | 247.06 |
| 8-Methylquinoline | $C_{10}H_9N$ | 247.75 |
| 3,4,5-Trimethylphenol | $C_9H_{12}O$ | 248 |
| Durenol (2,3,5,6-tetramethylphenol) | $C_{10}H_{14}O$ | 248 |
| Benzoic acid | $C_7H_6O_2$ | 249 |
| 5-Hydroxyhydrindene | $C_9H_{10}O$ | 251 |
| 2-Ethylnaphthalene | $C_{12}H_{12}$ | 252 |
| 3-Methylisoquinoline | $C_{10}H_9N$ | 252.25 |
| Indole | $C_8H_7N$ | 253 |
| Diphenyl | $C_{12}H_{10}$ | 255.2 |
| 1-Methylisoquinoline | $C_{10}H_9N$ | 255.25 |
| 2,8-Dimethylquinoline | $C_{11}H_{11}N$ | 255.25 |
| 7-Methylquinoline | $C_{10}H_9N$ | 257.6 |
| 6-Methylquinoline | $C_{10}H_9N$ | 258.6 |
| 3-Methylquinoline | $C_{10}H_9N$ | 259.55 |
| 2,6-Dimethylnaphthalene | $C_{12}H_{12}$ | 260.5 |
| 2,7-Dimethylnaphthalene | $C_{12}H_{12}$ | 262 |
| 1,7-Dimethylnaphthalene | $C_{12}H_{12}$ | 262 |
| 1,3-Dimethylisoquinoline | $C_{11}H_{11}N$ | 262.4 |
| 1,6-Dimethylnaphthalene | $C_{12}H_{12}$ | 262.5 |
| 5-Methylquinoline | $C_{10}H_9N$ | 262.7 |
| 4-Methylquinoline | $C_{10}H_9N$ | 264.2 |
| 5- or 7-Methylisoquinoline (probable) | $C_{10}H_9N$ | 264.9 |
| 3-Methylindole (skatole) | $C_9H_9N$ | 265 |
| 1,5-Dimethylnaphthalene | $C_{12}H_{12}$ | 265-265.5 |
| 6-Methylisoquinoline (probable) | $C_{10}H_9N$ | 265.5 |
| 7-Methylindole | $C_9H_9N$ | 266 |
| 2,3-Dimethylnaphthalene | $C_{12}H_{12}$ | 266 |
| 1,2-Dimethylnaphthalene | $C_{12}H_{12}$ | 266-267 |
| 4-Methylindole | $C_9H_9N$ | 267 |
| 5-Methylindole | $C_9H_9N$ | 267 |
| 3-Methyldiphenyl | $C_{13}H_{12}$ | 269 |
| 5,8-Dimethylquinoline | $C_{11}H_{11}N$ | >270 |
| 4-Methyldiphenyl | $C_{13}H_{12}$ | 271 |
| 2-Methylindole | $C_9H_9N$ | 271-272 |
| o-Phenylphenol | $C_{12}H_{10}O$ | 275 |
| 1,3,7-Trimethylnaphthalene | $C_{13}H_{14}$ | 280 |
| a-Naphthol | $C_{10}H_8O$ | 280 |
| Acenaphthene | $C_{12}H_{10}$ | 280.7 |
| a-Naphthofurane | $C_{12}H_8O$ | 282-284 |
| B-Naphthofurane | $C_{12}H_8O$ | 284-286 |
| 2,3,5-Trimethylnaphthalene | $C_{13}H_{14}$ | 285 |
| 2,3,6-Trimethylnaphthalene | $C_{13}H_{14}$ | 286 |
| B-Naphthol | $C_{10}H_8O$ | 286 |
| Diphenylene oxide | $C_{12}H_8O$ | 287 |
| 2,4,6-Trimethylquinoline | $C_{12}H_{13}N$ | 288 |
| 3,4$^1$-Dimethyldiphenyl | $C_{14}H_{14}$ | 289 |
| 4,4$^1$-Dimethyldiphenyl | $C_{14}H_{14}$ | 292 |
| g-Diphenylenemethane | $C_{13}H_{10}$ | 295 |
| 4,5-Benzindan | $C_{13}H_{12}$ | 295 |
| 1-Naphthonitrile (1-cyanonaphthalene) | $C_{11}H_7N$ | 297 |
| 1-Methyldiphenylene oxide | $C_{13}H_{10}O$ | 298 |
| Fluorene | $C_{13}H_{10}$ | 298 |
| Hydroacridine | $C_{13}H_{11}N$ | b.300 |
| 1-Naphthylamine | $C_{10}H_9N$ | 301 |
| 2-Methyldiphenylene oxide | $C_{13}H_{10}O$ | 303-304 |
| 2-Naphthonitrile (2-cyanonaphthalene) | $C_{11}H_9N$ | 304 |
| 2-Naphthylamine | $C_{10}H_9N$ | 306 |
| Paraffin (octadecane) | $C_{18}H_{38}$ | 308 |
| Henelcosane | $C_{21}H_{44}$ | 310 |
| 2-Methylfluorene | $C_{14}H_{12}$ | 318 |
| 3-Methylfluorene | $C_{14}H_{12}$ | 318 |
| p-Phenylphenol | $C_{12}H_{10}O$ | 319 |
| Tricosane | $C_{23}H_{18}$ | 320.7 |
| Tetracosane | $C_{24}H_{50}$ | 324.1 |
| Pentacosane | $C_{25}H_{52}$ | 325 |
| Docosane | $C_{22}H_{46}$ | 327 |
| Nonadecane | $C_{19}H_{40}$ | 328 |
| Hexacosane | $C_{26}H_{54}$ | 330 |
| Heptacosane | $C_{27}H_{56}$ | 330 |
| Octacosane | $C_{28}H_{58}$ | 330 |
| Diphenylene sulfide | $C_{12}H_8S$ | 332 |
| Phenanthrene | $C_{14}H_{10}$ | 340 |
| Tetramethylbiphenol | $C_{16}H_{18}O_2$ | 341 |
| Anthracene | $C_{14}H_{10}$ | 342.3 |
| Acridine | $C_{13}H_9N$ | 346 |
| 2-Hydroxybiphenylene oxide | $C_{12}H_8O_2$ | 348 |
| Phenanthridine | $C_{13}H_9N$ | 349 |
| 3-Methylphenanthrene | $C_{15}H_{12}$ | 350 |
| Carbazole | $C_{12}H_9N$ | 352 |
| 2-Hydroxyfluorene | $C_{13}H_{10}O$ | ca.352 |
| 4,5-Phenanthrylenemethane | $C_{15}H_{10}$ | 353 |
| 9-Methylphenanthrene | $C_{15}H_{12}$ | 354-355 |
| 1-Methylphenanthrene | $C_{15}H_{12}$ | 354-355 |
| 2-Phenylnaphthalene | $C_{16}H_{12}$ | 357-358 |
| Hydroxyanthracene | $C_{14}H_{10}O$ | d.360 |
| Naphthacene | $C_{18}H_{12}$ | 360 |
| 2-Methylanthracene | $C_{15}H_{12}$ | 360 |
| 2,7-Dimethylanthracene | $C_{16}H_{14}$ | 360 |
| 2-Methylcarbazole | $C_{13}H_{11}N$ | 363 |
| 1,2,3,4-Tetrahydrofluoranthene | $C_{16}H_{14}$ | 363-365 |
| Truxene | $(C_9H_6)_2$ or $(C_9H_6)_3$ | s.364-365 |
| 3-Methylcarbazole | $C_{13}H_{11}N$ | 365 |
| Fluoranthene | $C_{16}H_{10}$ | 382 |
| 2,3,5,6-Dibenzocoumarone | $C_{16}H_{10}O$ | 392-397 |
| Pyrene | $C_{16}H_{10}$ | 393 |
| 1,9-Benzoxanthene | $C_{16}H_{10}O$ | 395 |
| 2-Hydroxyphenanthrene (2-phenanthrol) | $C_{14}H_{10}O$ | 396 |
| Retene (8-methyl-2-isopropylphenanthrene) | $C_{18}H_{18}$ | 396.8 |
| 1,2-Benzofluorene | $C_{17}H_{12}$ | 413 |
| 2,3-Benzofluorene (isonaphthofluorene) | $C_{17}H_{12}$ | 415 |
| Naphtho-2$^1$,3$^1$-1,2-anthracene | $C_{22}H_{14}$ | 424 |
| 1,2-Benzonaphthacene | $C_{22}H_{14}$ | 425 |
| Phenanthridone | $C_{13}H_9NO$ | 435 |
| Dibenzothionaphthene | $C_{16}H_{10}S$ | ca.440 |

TABLE 1-continued

| Compound | Formula | Boil Pt. |
| --- | --- | --- |
| Sulfur | S | 444.6 |
| Chrysene | $C_{18}H_{12}$ | 448.5 |
| Triphenylene | $C_{18}H_{12}$ | 450 |

According to quantitative data the most prevalent components of creosote include naphthalene, phenanthrene, fluoranthene, fluorene, acenaphthene, methylnaphthalenes, carbazole, pyrene, anthracene, dibenzofuran, 9,10-dihydroanthracene, each of which comprise more than 1 wt-% in whole creosote (i.e. non-blended creosote).

Chemical components can also include other halogens, halogenated compounds and/or hazardous or toxic polymers. Such components contain at least one type of halogenated molecule (such as bromine or chlorine). Pentachlorophenol (PCP) is a commonly employed halogenated compound that is a carcinogen and requires destruction according to the invention. The PCP and by-products of its synthesis and destruction (including as disclosed at www.pentachlorophenol.info, which is herein incorporated by reference in its entirety) are all beneficially destroyed according to the invention. Creosote, its solutions, and borate systems added to creosote are the most common preservative systems employed for treated wood and beneficially processed to destroy such chemicals according to the present invention.

In an aspect, regardless of the chemical components used to treat the wood waste source, the invention beneficially recovers the energy in the waste source and returns it as a reusable energy source, and further safely decomposes any hazardous creosote and other chemical components including halogenated compounds and polymers without the production of any toxic components (such as dioxins and furans). As referred to herein, 'dioxins' refer to the family of compounds that include polychlorinated dibenzodioxins and 'furans' refer to the family of compounds that include polychlorinated dibenzofurans. These and other benefits of processing the described waste sources according to the invention are disclosed here.

As one skilled in the art will ascertain, waste sources according to the invention differ based upon the types of chemical treatment of the wood sources. As one skilled in the art ascertains, there are significant differences among chemical treatments and preservatives available for wood products employed in waste sources requiring processing according to this invention. The methods, systems, and/or processes of the present invention unexpectedly provide suitable conditions for the conversion of such diverse treated wood waste sources into desirable outputs described herein. However, the nature of the particular waste source will impact that particular thermolysis methods, systems, and/or processes of the present invention to convert such waste sources into a Clean Fuel Gas and Biochar.

Thermolysis Methods

The methods, systems, and/or processes of the present invention relate to thermolysis methods to safely and efficiently convert treated wood waste sources to gas/vapor mixtures and carbonaceous materials, namely a Clean Fuel Gas source and a Biochar. The Clean Fuel Gas source is suitable for use in powering a facility as an energy source, and the Biochar is suitable use as a soil amendment, water treatment, filtration, or other applications. In an aspect, the gas/vapor including halogens are cleaned and removed as disposable salts. In a further aspect, any mercury is vaporized in the reactors of the system. As a result of the methods described herein, a clean Biochar and Clean Fuel Gas are the only products of the system.

As referred to herein the thermolysis methods employ a continuous, oxygen-free thermal processing of the waste sources using heat energy. Beneficially, the methods, systems, and/or processes of the present invention convert the waste sources by destroying hazardous organic preservatives and chemicals and not generating additional toxic halogenated organic compounds present in the waste sources. As a further benefit, the methods, systems, and/or processes of the present invention generate clean, useable fuel gas sources substantially-free or free of halogenated organic compounds. As a still further benefit, the methods, systems, and/or processes of the present invention generate a Biochar which can be further utilized as a soil amendment, water treatment, filtration, or other applications and which is notably substantially-free or free of hazardous chemical components and therefore does not present any environmental concerns. In some aspects, the inorganic chemical compounds in the treated wood waste sources are substantially removed or removed by the methods, systems and/or processes or remain in the Biochar as a harmless product. In an aspect, the arsenic is removed by the methods, systems and/or processes and does not remain in a detectable amount within the Biochar.

As a still further benefit, the invention providing for the generation of a Clean Fuel Gas and Biochar without the formation of (along with the destruction of) halogenated compounds beneficially prolongs the life span of the systems employed for the thermolysis methods. Without being limited according to a particular mechanism, the reduction of formation of halogenated compounds including chloride species—which are the key halogens used in treated wood products, such as hydrogen chloride which is known to form hydrochloric acid in solution with water, reduces the corrosive damage caused to the systems, such as valves, filters, reactors and the like.

In an aspect the systems and apparatuses utilized for the methods and processes of the present invention includes at least the following components as substantially depicted in FIG. 1, including: a feedstock input, airlock, at least one reactor (and preferably a series of reactors), gas scrubbers, tar/oil crackers (or may be referred to as cracking reactor), collection tanks for Biochar, and output for Clean Fuel Gas. Additional optional components may include for example, pipes for addition of steam generated via heat exchange for injection into the reactor(s). Modifications to these systems and apparatuses, including as described herein, are considered within the level of ordinary skill in the art based upon the description of the invention set forth herein.

In an aspect the methods, systems, and/or processes of the present invention include the steps as substantially depicted in FIG. 1, including the following processing steps: shredding, chopping and/or grinding of the waste source inputs; a reaction or series of thermolysis reactions in a substantially oxygen-free continuous, low pressure thermolysis process with indirect heating; employing more than one reactor for the thermolysis reactions; separation of Biochar; a tar and oil reprocessing or cracking step; and scrubbing of the fuel gas.

Figure 2:
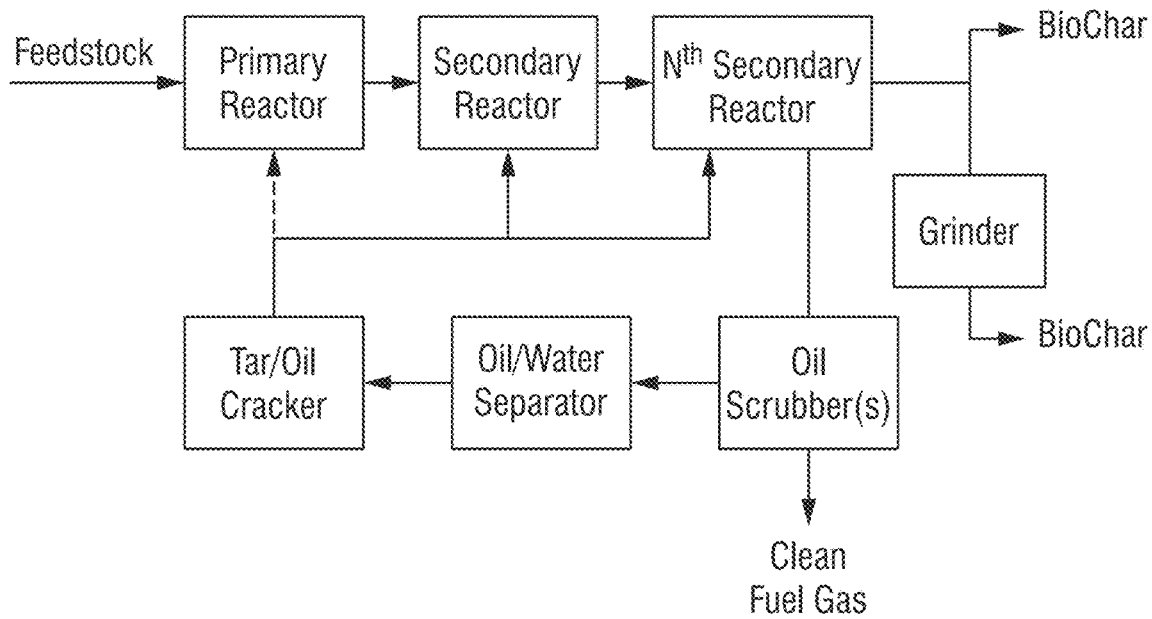

In an aspect the systems and apparatuses utilized for the methods and processes of the present invention includes at least the following components as substantially depicted in FIG. 2, including: a feedstock input, at least one primary reactor and at least one secondary reactor (and preferably a series of secondary reactors), at least one oil/gas scrubber, at least one oil/water separator, at least one tar/oil cracker (or may be referred to as cracking reactor), an optional grinder for the Biochar, at least one collection tank for Biochar, and output for Clean Fuel Gas. Additional optional components may include for example, pipes for addition of steam generated via heat exchange for injection into the reactor(s). Modifications to these systems and apparatuses, including as described herein, are considered within the level of ordinary skill in the art based upon the description of the invention set forth herein.

In an aspect the methods, systems, and/or processes of the present invention include the steps as substantially depicted in FIG. 2, including the following processing steps: shredding, chopping and/or grinding of the waste source inputs; a reaction or series of thermolysis reactions in a substantially oxygen-free continuous, low pressure thermolysis process with indirect heating; employing more than one reactor for the thermolysis reactions; separation of Biochar and optional grinding of Biochar to provide smaller particle sizes for various applications of use; oil scrubbers (wherein a series of parallel oil scrubbers could be used for decreased processing time and increased surface area; or wherein a series of sequential oils scrubbers can be used); oil/water separators; and a tar and oil reprocessing or cracking step.

Figure 3:
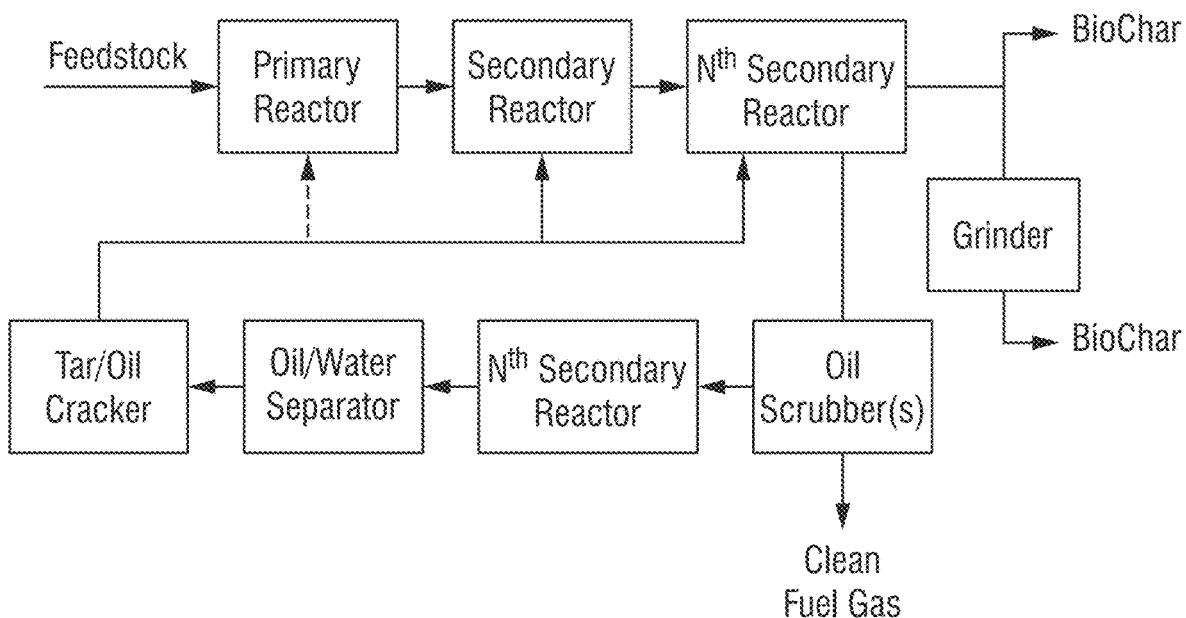
Figure 4:
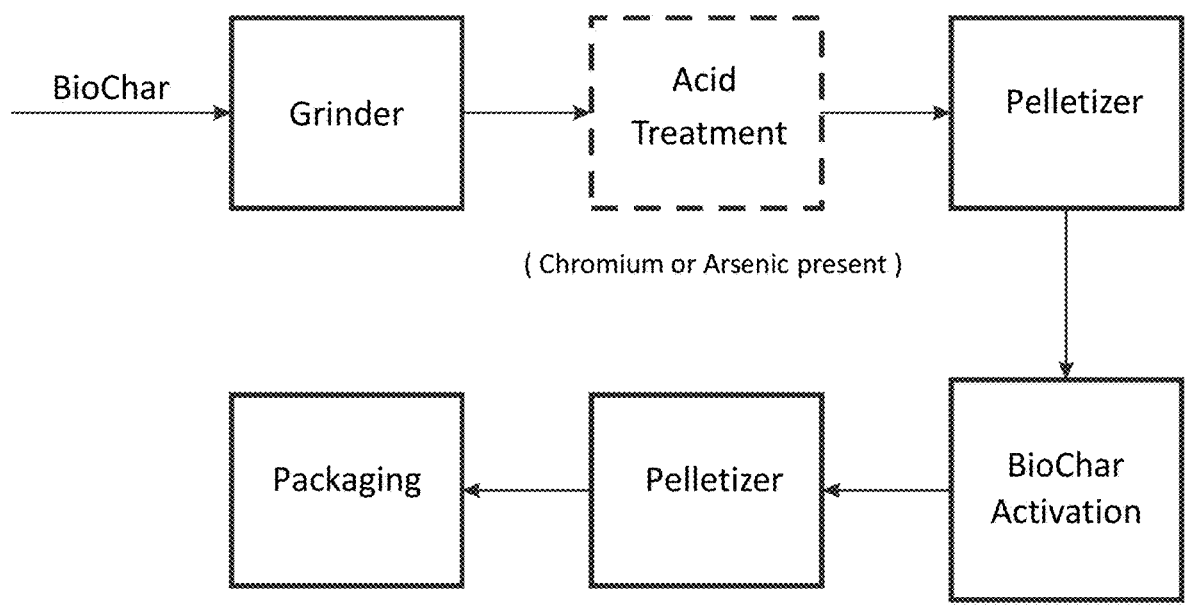
FIG. 4 shows an exemplary process diagram for further processing of Biochar for the methods, systems and/or processes of the invention.

Additional in a further aspect of the methods, systems, and/or processes of the present invention include the steps as substantially depicted in FIG. 3. As shown in FIG. 3 additional or "Nth Oil Scrubbers" can be employed. Notably, each oil scrubber unit has a dedicated or its own oil water separator unit.

The methods, systems, and/or processes of the present invention may optionally include one or more of the following steps: initially processing the waste input to remove and/or recover creosote compositions, drying the waste input or adding moisture to the waste input (e.g. via steam injection into the reactor to enhance gasification); employing additional gas scrubbers; collection and separation of components from the Biochar).

The methods, systems, and/or processes of the present invention can be carried out in a variety of apparatus for thermolysis. An exemplary device or series of reactors, further including oil and other separators, char/oil separators, gas scrubbers, evaporators, and the like are shown for example in U.S. Patent Publication No. 2014/0182194, which is incorporated herein by reference in its entirety.

In an aspect, the invention includes an initial shredding, chopping and/or grinding step of the treated wood waste sources, each of which may be referred to herein as shredding and/or grinding. The scope of the invention is not limited with respect to this initial processing step to reduce the size of the input waste source and provide a substantially uniform input source. In an aspect, the waste sources can be placed directly into a grinder or shredder. In an aspect, the grinding and/or shredding step provides substantially uniform pieces of the input source. In an aspect, the grinding and/or shredding step provides pieces of the input source having an average diameter of less than about 5 inches, preferably less than about 2 inches, preferably less than about 1 inch, or in some aspects, to less than about 0.5 inches. In an aspect, the shredding and/or grinding can include a first coarse step followed by a fine shredding and/or grinding step. In an alternative aspect, the shredding and/or grinding can include a single processing step.

Various shredding and/or grinding techniques may be employed according to the invention to provide the waste input source in a desirable size or form for processing. In a preferred aspect, the waste sources are ground and/or shredded to a size of less than about 5 inches, or less than about 2 inches, or less than about 1 inch to provide a substantially uniform input source. In a further preferred aspect, the substantially uniform input source is combined with any dust or other debris from the shredding and/or grinding step that is recovered for processing according to the methods of the invention.

Beneficially, according to the invention a variety of waste sources and other waste sources can be processed according to the invention without substantial extraction steps to remove or separate various components for distinct and separate processing. This is a significant benefit over processing systems and techniques of the prior art requiring substantial sorting and separation of components. This is a known limitation of recycling efforts, that a great deal of manual and/or mechanical energy is required to sort and separate materials to be recycled. The present invention does not require such extensive separation into similar types of materials for the processing of the treated wood waste sources.

Creosote Recovery

However, in certain embodiments an initial step of creosote recovery may be valuable for certain applications where it is desirable to recover the creosote instead of destroying the compounds in the processing of the treated wood waste sources. In an embodiment, liquid creosote compositions can be extracted from treated wood waste sources having been treated with creosote compositions. In embodiments where creosote recovery (i.e. recovery and collection for use in other applications) is beneficial, such as the collection and reuse of coal tar distillates and fractions, the creosote is recovered before the treated wood waste source is processed according to the thermolysis methods and reactions described herein. The steps for recovering creosote are not depicted in FIGS. 1-3, instead they would precede the feeding of the waste source to the primary reactor, either before or after the step of shredding the waste source.

An exemplary embodiment for initial processing of the waste source to recover creosote is for end of life railroad ties. This waste sources is estimated to contain about 10-30% or about 15-25% liquid composition, referred to as wood vinegar. Wood vinegar contains water (moisture/aqueous component that is the decomposed wood in the wood waste source), wood cellulose fragments, creosote components (PAHs). The liquid composition can have about 10-16% creosote content. These components will gasify and not condense in the water. Accordingly, methods to collect the creosote can provide beneficial re-use.

In an embodiment, the method for recovery of creosote comprises providing the treated wood waste source to a preheated chamber, preferably at a temperature range from about 300-350° C., as the creosote hydrocarbons in the wood vinegar begin to evaporate at a temperature of about 250° C. Such a creosote recovery chamber would be located externally to the reactor system to enable recovery without affecting the internal reactor conditions needed for quality biochar production. The treated wood waste sources remains in the chamber for a few minutes (e.g. 1 minute to about 60 minutes) to at least an hour to allow volatilization and evaporation of the creosote compounds. The gas vapors are then condensed and removed from the chamber. The remaining treated wood waste source is then provided for processing in the reactors using the thermolysis methods described herein.

Processing Methods

In an aspect, the invention involves a reaction or series of thermolysis methods and reactions in a substantially oxygen-free continuous, low pressure, thermolysis process using heat energy. In an aspect, low pressure includes from about 10 to about 100 millibar, or any range therein. In an aspect, the invention involves an oxygen-free continuous, low pressure, thermolysis process in a reactor or series of reactors. As referred to herein, the oxygen-free process in the reactor(s) does not include air or oxygen in contact with the waste input source. Beneficially, because of the reduction and/or elimination of oxygen from the methods, systems, and/or processes of the present invention, the waste input sources are not exposed to flame and/or fires or plasma source and therefore do not form polycyclic aromatic hydrocarbons (PAHs), halogenated dibenzodioxins, halogenated dibenzofurans, biphenyls, and/or pyrenes, or other halogenated organics. In an aspect, the total aggregate composition of the waste sources comprising up to 10% halogen content (including for example PAH and borate compounds), often from 0.01% to 10%, or from 0.1% to 5% are processed according to the methods, systems, and/or processes of the present invention without the creation of PAHs, halogenated dibenzodioxins, halogenated dibenzofurans, biphenyls, and/or pyrenes. As one skilled in the art will appreciate, the various treated wood waste sources will vary in the halogen content introduced for processing. For example, a pentachlorophenol has approximately 66% chlorine and is often added in a loading of less than about 5% of a preservative or other chemical treatment system.

In a further aspect, the invention further includes the destruction of toxins, namely halogen compounds in addition to not generating any toxins as mentioned above. In an aspect, the methods destroy aliphatics, aromatics, and polycyclic aromatic hydrocarbons, halogenated dibenzodioxins, halogenated dibenzofurans, biphenyls, pyrenes, chlorofluorocarbons, etc.

In an aspect, the invention employs the substantially oxygen-free or oxygen-free continuous, low pressure thermolysis process with supply of heat energy. Thermolysis methods are known to employ different methods and amounts of heat energy, including for example: Low temperature thermolysis with a process temperature below 500° C.; medium-temperature thermolysis in the temperature range 500 to 800° C.; and melting thermolysis at temperatures of 800 to 1,500° C. According to aspects of the present invention, the substantially oxygen-free or oxygen-free continuous, low pressure thermolysis process applies indirect heating. In an aspect, the heating includes processing the waste source input at temperatures of about 300° C. to 1000° C., preferably from about 400° C. to 650° C. Beneficially, the use of a lower temperature thermolysis process places less stress on a reactor(s) (such as steel reactors), requires less energy to run the continuous process according to the invention, and further maintains metals in contact with the system at lower temperature ranges which improves longevity, processing, etc. within a plant facility.

In an aspect, a reactor or series of reactors (also referred to as cascading reactors) allows for the thermolysis processing over the lower range of temperatures from about 300° C. to about 1000° C., preferably from about 400° C. to 650° C. As one skilled in the art understands, there is not a single processing temperature for an input source according to the invention; instead a range of temperatures within a reactor (or series of reactors) is obtained. For example, within a single reactor the input source within the head of the reactor may be at a higher temperature than the bottom of the reactor. In addition, as one skilled in the art understands, the use of a single reactor may necessitate a higher temperature range, such as from about 600° C. to about 800° C., where a series of reactors enables a lower range of temperatures, such as from about 400° C. to about 600° C. In preferred aspects, the reactor(s) employed according to the methods of the invention do not require design for withstanding high temperature/pressure, as the relatively low temperature and pressures are employed (such as on average about 650° C. and ambient pressures of on average about 50 mbar).

The continuous thermolysis process is carried out in at least one reactor to undergo at least partial gasification. Various reactors known in the art can be employed, including for example, rotary drum reactors, shaft reactors, horizontal reactors, entrained-flow gasifiers, fixed-bed gasifiers, entrained-flow gasifiers, or the like. Exemplary reactors are disclosed, for example in, U.S. Publication No. 2014/0182194 and DE 100 47 787, DE 100 33 453, DE 100 65 921, DE 200 01 920 and DE 100 18 201, which are herein incorporated by reference in its entirety. As one skilled in the art will ascertain the number, sequence and scale of the reactors employed according to the invention can be adapted pursuant to the scale and volume of treated woods and other waste sources inputted, which are embodied within the scope of the invention.

In some embodiments, a primary reactor employed according to the invention may comprise, consist of or consist essentially of input region with distributor, reactor mixing chamber, high-temperature region, high-temperature chamber, heating jacket chamber with burners, conversion section, inner register, and/or h eat transfer register. In exemplary embodiments, a secondary (or tertiary) reactor(s) employed according to the invention may comprise, consist of or consist essentially of gas compartment with dome, high-temperature chamber with vertical conveying device, inner register and outer register, conversion section with conveyor device, heating jacket chamber and/or combustion chamber.

In an aspect, the reactor(s) are jacket-heated. In an aspect, the reactors are vertically and/or horizontally disposed over a range of angles. In an aspect, at least two reactors are employed. In an aspect, at least three reactors are employed. In a preferred aspect, at least one reactor or a primary reactor is vertical with a moving bed design and counter-current flow for the fuel gas along the heated walls into secondary reactors. Without being limited according to an embodiment of the invention, such designs minimize the creation of undesirable tars and fuel oils. In a further preferred embodiment, a moving bed design is further employed for a secondary horizontal reactor which extends the controlled reaction time and temperature of the fuel gas and Biochar from improved solid/gas and gas/gas reactions according to the invention.

The of waste sources undergo the conversion in the reactor(s) for an amount of time enough to provide at least partial conversion and substantially as set forth according to the methods of U.S. Publication No. 2014/0182194. In an aspect, the amount of retention time in a reactor(s) varies from at least about 20 minutes, at least about 30 minutes, at least about 40 minutes, at least about 50 minutes, at least about 60 minutes, or at least a few hours as may vary based upon factors including for example the total aggregate amount of chemistry (e.g. preservatives and treatment) on the wood source. Unexpectedly, despite the cellulosic nature of the waste source, which one skilled in the art would not expect to require additional processing time using the thermolysis methods, the processes and methods requiring extended reaction time to ensure that the PAH, and particularly the PCP molecules are destroyed completely. In some aspects, the processing time is unexpectedly increased by at least about 20% or even 25% as a result of the longer retention time for complete removal of the oils and tars along with all hazardous components from the system.

In an aspect, the pressure in the reactor(s) is held constant within a pressure range from about 10 to about 100 millibar, or preferably from about 20 to about 50 millibar.

In an aspect, a moisture content of a waste input source may be measured to determine whether moisture is to be added to the system for improved gasification. In an aspect, steam is generated via heat exchanger and the process steam is injected through pipelines directly into a reactor(s) head to increase moisture content. In an aspect, a waste input source having a low moisture content, such as below about 10%, below about 9%, below about 8%, below about 7%, below about 6%, below about 5%, below about 4%, below about 3%, below about 2%, or less, will have steam injected into the process to improve the gasification reaction. In an aspect, steam is added to the reactor(s) head to increase moisture content to at least about 10% to improve the gasification process of the low-density input of the feedstock.

In an additional aspect, monitoring of the pressure in the reactors can be employed to determine if further moisture is to be added to the system for improved gasification. In such an aspect the reactor system controls automatically adjust volume of steam based on temperature and pressure in the reactor to optimize the gasification reaction.

In an aspect, the methods further include a tar and oil cracking step. As one skilled in the art appreciates, tars and oils are an unavoidable product of the pyrolysis process, which are a non-heterogeneous mixture of olefins and paraffins, which contain tars and hazardous components including poly aromatic hydrocarbons (PAHs). These hazardous components include carcinogens benzene, toluene and chlorinated-brominated components, PCP, PVC and/or halogenated compounds present in the treated wood waste feedstock. The pyrolytic oils have a low flash point and are known to be extremely hazardous (often requiring hazardous regulatory permits in various countries). Beneficially, according to the invention such unavoidably created tars and oils are merely an intermediate and are subsequently cracked to ensure removal before generating the outputs of Clean Fuel Gas and Biochar.

As referred to herein, "cracking" refers to the process whereby complex organic molecules are broken down into simpler molecules, such as light hydrocarbons, by the breaking of carbon-carbon bonds in the precursors. Thus, cracking describes any type of splitting of molecules under the influence of heat, catalysts and solvents. Accordingly, tars and oils are not collected or an output of the thermolysis methods of the invention. In a preferred aspect, more than one gas converter (cracking reactor) will be employed either in sequence or in parallel to ensure that the higher organic components are further degraded. This removal and conversion of these heavy oils or tars into Clean Fuel Gas is desired to remove these materials which selectively absorb halogenated hazardous substances. In an aspect, the step recycles tars and oils through at least one reactor system to remove the hazardous halogenated compounds. In a further aspect, the tar and oil cracking step has the beneficial effect of creating more clean fuel gas.

In an aspect, the generated tars and oils are processed in the presence of an optional catalyst, such as for example zeolite. In an embodiment, the cracking step separates light and heavy oils, such as disclosed for example in U.S. Patent Publication No. 2014/0182194, which is incorporated herein by reference in its entirety.

In an aspect, the methods may further include an optional cooling step for the gas. In some embodiments, the gas will be cooled due to further processing in a scrubbing stage. For example, a cooled conversion chamber may be in connection with a reactor according to the methods of the invention. In an aspect, a gas at a temperature from about 400° C.-800° C. is cooled to a temperature below about 100° C., or preferably below about 80° C. The gas may further thereafter be cooled to an ambient temperature, such as in an adjacent water scrubber to remove any excess water and/or steam from the gas.

In an aspect, the methods may further include a conditioning step, such as employing and additional gas scrubbers. In an embodiment, gas produced may be further purified following cooling at a gas scrubbing stage, i.e. an alkaline stage (for example, NaOH or $Ca(OH)_2$ for the binding of HCl and HBr) and fed to the downstream process.

In an aspect, the methods convert the treated wood waste sources into a Biochar and a Clean Fuel Gas source. In an aspect, the invention will further include a recycling step for the recycling of any oils and tars created from the methods described herein. In an aspect, the recycling of the oils and tars involves cracking them and then reprocessing the shorter chain molecules into a main reactor to be converted into additional Clean Fuel Gas. The cracking can occur at a temperature range of from about 350° C. to about 1100° C. and may be in the presence of catalysts, such as zeolites. In an aspect, the generated tars and oils are processed in the presence of an optional catalyst, such as for example zeolite. In an embodiment, the cracking step separates light and heavy oils, such as disclosed for example in U.S. Patent Publication No. 2014/0182194, which is incorporated herein by reference in its entirety.

In a beneficial aspect of the invention, such generated Clean Fuel Gas is suitable for use in maintaining operation of the processes of the invention at a point of use (i.e. facility employing the methods, systems, and/or processes of the present invention).

In an aspect, the invention further includes a separation step for the further processing of the generated Biochar.

In a further aspect, the invention optionally includes a grinding step or similar step to reduce the size of the Biochar. For example, an additional step of grinding the Biochar to provide substantially uniform particles between about 1-80 mm for desired applications of use is included. Biochar processing steps are described below.

In an aspect, the exhaust gas cleaning module has a conventional particulate removal system and can be optionally equipped with a gas scrubber with solid removal. A fan can be added if necessary before entering the stack.

In an aspect, the invention further includes a cleaning step for the further processing of the generated fuel gas. Such step may be referred to as a "wet scrubbing" step. This step is beneficial in removing particulates from the treated wood waste source that are likely to form during the thermolysis methods and beneficially removed in the scrubbing step. For example, such a step is particularly useful in applications for the further processing when mercury-containing compounds were included in the processed waste source. Such step may also include the removal of mercury having formed a mercury halide, which may be as an insoluble halogen salt in water which is removed in the scrubber. In an aspect, the mercury halide is scrubbed out in the scrubber and thereafter disposed. In an aspect, the gas is introduced as a gas flow into a wet scrubber for purification. In an aspect, the gas scrubber(s) separate tars, oils and Biochar from the product gas flow. In a further aspect, the gas scrubber(s) can further cool the product gas, for example to a temperature below about 80° C. The scrubber(s) may further be employed for a final removal step for any toxic compounds in the fuel gas product.

In an aspect, the produced fuel gas/water vapor mixture enters the gas cleaning, i.e. scrubber system. In an aspect, each reactor line has its own first gas cleaning unit. The gas streams are combined after the first scrubber units and will enter the additional scrubbers afterwards.

In an aspect, the gas cleaning units include or consist of scrubbers, vessels, pumps, oil discharge units and heat exchangers. Water combined with additives, such as for example an alkalinity source (e.g. NaOH of $Ca(OH)_2$) or other source such as limestone for removal of sulfur, which are known to those skilled in the art of incineration technologies. Notably, the heating methods according to the invention are distinct from incineration as external heating is provided. For clarity, the methods of the invention do not employ incineration. Those skilled in the incineration arts understand scrubbing using water containing alkaline materials to remove acidic components are distinct methods. These are used in a closed loop system to clean condensates and contaminants out of the gas stream and to cool the gas down. The condensates contain olefins, aromatics and paraffins as solids and water. The standard system includes or consists of five gas cleaning systems. This amount can be reduced or increased depending on the feedstock specifications employed according to embodiments of the invention. The scrubbed components like tar and the light oils fraction will be the feedstock of the cracking reactors. Notably the light oils are not reused and instead cracked through the cracking reactors.

In an aspect, the fuel gas is transported through the gas cleaning system by increasing the pressure, such as to about 100 mbar by ventilation systems. In an aspect, 100 mbar is the limit value for the system employed according to the invention.

In an aspect, the wastewater treatment includes or consists of a physical and biological treatment segment. The wastewater can be discharged after pre-treatment and cleaning.

In an aspect, the safety system transports the fuel gas to a flare in case of an emergency. In an aspect, all the pipelines have valves, which automatically open in case of a power failure. In a further aspect, the connecting pipes to the flare are equipped with burst discs, which will prevent excessive pressure in the reactors and the gas cleaning systems. In case of an emergency, this system will help to shut down the system in a safe manner.

Exemplary Embodiment for Processing Waste Sources

In an aspect, a waste input material is stored in a hopper and transported by the first screw conveyor as the first drying unit, which may consists of several connected units. In an aspect, the screw conveyors are indirectly heated by the exhaust gas of the reactor gas burners after it is cooled by heat exchangers to 350° C. In an aspect, the discharge points of the water vapor are between the screw conveyors and are supported by slightly negative pressure and the vapor is collected for condensation.

In an aspect, the waste input material is fed by the last screw conveyor through an airlock system into the primary reactor unit. The first primary cracking and gasification reactions occur in this vertical reactor unit. The material is fed through the upper part of the reactor, the reactor head, and into the upper mixing chamber. The mixing chambers and the high-temperature chambers are indirectly heated through gas burners at the outer wall of the reactor. In an aspect, the material flow inside the reactor is controlled by an internal screw conveyor and a rotor unit.

In an aspect, the mixing and high-temperature chambers are enclosed by the outer burning chamber, which is heated by gas-burners capable to run on Natural Gas or the clean fuel gas generated by the systems of the invention after it is cleaned in the scrubbing system.

In an aspect, the exhaust gas of the gas burners is utilized to dry the waste input material, if the waste source needs drying. In an embodiment, the desired moisture content should be in the range of about 1-25%, or preferably from about 5-20%.

In an aspect, the produced fuel gas and the coke are ducted into the first of two secondary reactors at the bottom of the vertical reactor. In an aspect, these reactor units are nearly horizontal and are also indirectly heated screw conveyor units. Additional gasification of the material and gas reactions occurs in the secondary reactor units. They are heated by their own burner units.

In an aspect, the remaining residues are Biochar and it is discharged at the end of the second secondary reactor unit after being cooled down with steam/water. Any metals (e.g. straps, nails, screws, bolts, etc.) in the treated wood feedstocks will be in the Biochar and can be separated at this time.

In an aspect, additional cracking reactors are integrated in the gasification system. These are independent heated pipe reactors, which are designed to handle any tar components, which are being condensated in the first scrubber unit. The tars are being cracked and the fuel gas will be ducted back into the first secondary reactor.

In an aspect, the entire system is secured for the case of excessive pressure. Burst discs at the main gas distribution points and the reactors ensure that any gas will be ducted to a flare and being burnt. In an aspect, water vapor can be injected into the primary reactor to cool down the primary reactor and stop the gasification reactions inside the reactor.

In an aspect, the produced fuel gas/water vapor mixture enters a gas cleaning/scrubber system. Each reactor line has its own first gas cleaning unit. The gas streams are combined after the first scrubber units and will enter the additional scrubbers afterwards. In an aspect, the gas cleaning units consists of scrubbers, vessels, pumps, oil discharge units and heat exchangers. Water combined with additives are used in a closed loop system to clean condensates and contaminants out of the gas stream and to cool the gas down. The condensates contain olefins, aromatics and paraffins as solids and water. In an aspect, the system consists of five gas cleaning systems. This amount can be reduced or increased depending on the feedstock specifications. The scrubbed components like tar will be the feedstock of the cracking reactors, the light oil fraction of aromatic oil and olefins will be separated from the solids/water and reprocessed in the gasification system and the water will be pre-cleaned and reused.

In an aspect, the fuel gas is transported through the gas cleaning system by increasing the pressure to 100 mbar by ventilation systems. 100 mbar is the limit value for the whole system. In an aspect, these components are redundant and can be bypassed.

In an aspect, the wastewater treatment consists of a physical and biological treatment segment. The wastewater can be discharged after pre-treatment and cleaning.

In an aspect, the safety system transports the fuel gas to a flare in case of an emergency. All the pipelines have valves, which automatically open in case of a power failure. The connecting pipes to the flare are equipped with burst discs, which will prevent excessive pressure in the reactors and the gas cleaning systems. In case of an emergency, this system will help to shut down the system in a safe manner.

Optional Additions for Enhanced Processing and Efficiency of Thermolysis Methods The methods of the present invention are suitable for combination with additional inputs to further maximize the efficiency of the methods and systems employed. It is known that power generation equipment is designed to perform at best efficiencies for converting the supplied fuel into power at a specified range of fuel load. This range for gas turbines and gas engines is generally in the 80% to 100% fuel gas capacity of the selected gas turbine or gas engine. Efficiency is determined as thermal energy required in the fuel gas to generate power and provided by the vendors in BTU/kWh valid for the specified range of 80% to 100% capacity fuel gas load of their equipment. As one skilled in the art will ascertain, fuel gas loads of <80% will decrease the efficiency of converting the thermal energy of the fuel gas into power.

According to optional embodiments of the invention, the clean fuel gas source output according to the methods of the invention can be further enhanced and/or stabilized to a constant output, such as measured on a cfm (cubic feet per minute) and the heating value of the clean fuel gas source constantly controlled in BTU/cu.ft. The quantity and the heating value of the clean fuel gas source are dependent on the feedstock properties processed according to the embodiments of the invention. A homogenous feedstock Input into the reactors will yield a consistent clean fuel gas source Output for both parameters: cfm and heating value per cu.ft. supplied to a gas turbine/engine. Fluctuations in the feedstock will change the quantity of the generated clean fuel gas source and its heating value per cu.ft. For example, according to various embodiments of the invention were distinct waste sources are employed, such as the differences between oak or pine wood and their specific additives, according the clean fuel gas output will be varying according to cubic feet per minute and BTU/cu.ft.

Generated Outputs of the Thermolysis Methods

In an aspect, the methods, systems, and/or processes of the present invention convert the treated wood waste sources into a Biochar and a Clean Fuel Gas source. Beneficially, the hydrocarbon materials from the treated wood waste input are converted to the Clean Fuel Gas while the other materials are collected as "Biochar." As a further benefit, any oils and tars created are recycled into the secondary reactor(s) and cracking reactor(s) to be converted into additional fuel gas, such as may be employed to maintain operation of the processes of the invention at a point of use (i.e. facility employing the methods, systems, and/or processes of the present invention).

In another aspect, the methods, systems, and/or processes of the present invention convert the treated wood waste sources into a Biochar and a Clean Fuel Gas source as well as recover the creosote from the treated wood waste input before conversion into the Clean Fuel Gas and Biochar.

Biochar

The methods according to the invention employing the thermolysis methods beneficially provide a processed Biochar which is a non-hazardous material. Biochar is often in the particle size range between sand and finer silt in order to maximize surface area. Biochar created from thermally processing hard wood and softwood biomass (e.g. wood sources most common from end of life railroad ties and utility poles) according to the thermolysis methods is a carbon rich microporous structure. The cellulose/hemicellulose carbon structure contains different functional groups that include carboxylic, carbonic, phenolic and other similar chemistry. The combination of these functional chemical groups enhances the attractiveness of Biochar to be used for wastewater, air purification, $CO_2$ capture, toxic gas adsorption, water retention, catalytic/electrical applications, soil amendment, animal nutrition/toxic encapsulation in the gut and mineral storage matrix with micro-nutrients for plant root structures. The range of suitable applications is dependent on the porosity of the Biochar measured in square meters per gram ($m^2$/gram). The higher the porosity the better the adsorption value of the Biochar (and generally the higher value of the Biochar). Low values in the 200 $m^2$/gram are used for basic soil amendment, ground contamination recovery and are the most economical. Biochar with very high porosity serves in the activated charcoal or activated carbon applications for high value and performance of the adsorption.

The biochar is an output form the secondary reactor (or Nth secondary reactor) of the system. In an embodiment, the biochar can be ground to a smaller particular size in order to maximize surface area. As shown in FIGS. 2-3 a grinder can be employed to reduce the particular size of the Biochar to less than about 10 mm, 9 mm, 8 mm, 7 mm, 6 mm, or preferably between about 4-6 mm. In another embodiment, the Biochar is preferably pelletized to beads the size of approximately 1-10 mm, preferably 2-8 mm, or more preferably less than about 4-6 mm or less than about 4 mm. Without being limited to a particular mechanism of action, the pelletized Biochar ensures reduction of any fine particulates and to ensure separation such that any subsequent portion of the system is not clogged.

In an embodiment, it is desirable to 'activate' the biochar product in order to maximize surface area of the Biochar by increasing its porosity for the benefits previously described. The activation of the Biochar can be both preceded and/or followed with a pelletizing step to reduce the particle size of the material.

In a first embodiment, activation by steam is a process well suited for processing the biochar obtained from the treated wood waste source. Beneficially, steam activation is the lowest cost to process in high volumes of the Biochar. The Biochar steam activation is performed in horizontal processing equipment (i.e. rotary calciner, also called rotary kilns). The Biochar that has been pelletized is fed into the equipment, such as the rotary calciner, on a continuous basis. Steam in the range of about 600-900° C. is piped into the rotary calciner to activate the surface of the Biochar pellets. In an embodiment, the steam activation process will take from about 30-90 minutes. The higher the temperature and longer the exposure or dwell time the greater the porosity or activation. Porosity >1200 $m^2$/gram can be produced but the economics and performance may not justify the process time. One skilled in the art will ascertain the desired dwell time for the steam activation. The activated pellets of Biochar are then cooled following processing, dried, packaged and available for sale to the respective markets.

In a second embodiment, activation by chemical treatment (or chemical activation) can be used for processing the biochar obtained from the treated wood waste source. Chemical activation is suitable for Biochar applications with higher performance in purification processes from air/chemical masks to highest purity water treatment filtration systems. The chemical processing uses acid or alkaline oxidizing agents, amination, sulfonization and combinations of these to achieve the highest level of porosity for both organic and inorganic compound adsorption. The activated pellets of Biochar are then cooled following processing, dried, packaged and available for sale to the respective markets.

In an embodiment, between about 15-40% of the weight of the treated wood waste source is converted to Biochar. Temperatures higher than 700° C. will produce the least mass (15-20%) of Biochar. Temperatures lower than 500° C. will produce the highest mass (20-40%) of Biochar. Expected average mass is between about 25-30%. The conversion will also depend on water content in the treated wood waste source and reactor processing time. Typical moisture levels are between about 15-30% with 20% being the preferred target. The higher water content will also produce lower levels on Biochar as water in being gasified in the primary reactor.

In an embodiment, further processing for removing arsenic and chromium contaminants from the Biochar may be required. These steps include the following conditions: contacting the Biochar with an acidic solution having a pH between about 1-6, such as an HCl solution, for a period of time from about 30 minutes to about 6 hours. In an exemplary embodiment, the acid treatment for processing for removing arsenic and chromium contaminants include contacting the Biochar with 1-2.5% oxalic acid solution at 80° C. for 1 hour. This optional step to remove the presence of arsenic and chromium contaminants precedes the steps to activate the Biochar. In an exemplary embodiment, for treated wood sources that contain copper chromium arsenate (CCA) and/or pentachlorophenols (PCP), the Biochar is treated to remove the arsenic and chromium. For such treatment to remove arsenic and chromium contaminants, the Biochar is conveyed to a separate holding tank, such as a stainless steel vessel of varying sizes depending upon the amount of Biochar treated (e.g. 100-2000 gal). The Biochar would be slurried with a dilute acid, such as an acidic pH from about 1 to about 5, or preferably from about 1 to about 4 such as for HCl solution, in the holding tank, preferably an agitated holding tank. The dilute aqueous acid solution would be drained from the tank. The acidified Biochar would be neutralized with a mild base to precipitate the Chromium arsenate and copper metals from the Biochar and separating the contaminants from the Biochar. The Biochar charge would then be piped/dropped to a centrifuge for washing, drying and de-watering. The damp centrifuge cake removed for drying and any post processing needed, including for example the Biochar activation described above. Beneficially, the dilute acid-neutralization does not damage the cellulose structures of the Biochar from the wood waste sources. Instead, it is beneficially shown that the activation chemistry and/or steam activation is able to further increase the surface area in m²/grams of the Biochar.

As one skilled in the art will appreciate the Biochar that is obtained will vary according to the type of treated wood waste source being processed. For example, the Biochar obtained from utility poles from soft woods like pine, fir and west cedar will be different that from railroad ties and hardwood. The Biochar will have different properties when formed from hardwood or from softwoods.

Biochar is a product most often used as a soil amendment that would not degrade, sequester carbon, maintain soil fertility, and add hydration value in areas of frequent water stress. Biochar is also suitable for use as water treatment additive (such as an activated carbon) that can be added to storm water run-off and then filtered out later. Beneficially, in a water treatment additive application, the minerals and contaminants in the storm water would be adsorbed on the surface of the Biochar. Still further, Biochar is suitable for use in stabilizing soil, such as applications before a roadway is paved.

In an aspect, the Biochar is substantially-free or free of toxic chemicals, including pentachlorophenols (PCP) and other polycyclic aromatic hydrocarbons (PAH), dioxins, furans and the like. The Biochar must be cooled down before opening to air to prevent formation of hazardous dioxins and furans (e.g. less than about 120° C.). In an aspect, the Biochar is a carbon-rich material and contains up to about 100% carbon without significant amounts of additional materials. In an embodiment, the Biochar generated will have a variable composition dependent upon the type of treated wood material processed according to the invention; however, such variable composition is a minor portion of the Biochar as the material is nearly entirely carbon following processing according to the invention.

In an aspect, the Biochar is substantially-free of halogen compounds. In a further aspect, the Biochar is substantially-free of toxic chemicals and halogen compounds. In an aspect, the Biochar is free of toxic chemicals, including for example arsenic-containing compounds. In an aspect, the Biochar is free of halogen compounds. In a further aspect, the Biochar is free of toxic chemicals and halogen compounds.

In an aspect, the Biochar is substantially free of arsenic and chromium compounds or elements. The Biochar would be treated with combinations of dilute acids, bases or complexing compounds such as oxalic acid to remove the unwanted inorganic elements.

In an aspect, the Biochar is particularly well suited for use as a soil amendment, water treatment, filtration, or other applications. Beneficially the clean characteristics of the Biochar do not introduce hazardous or toxic materials, PAHs, dioxins, furans and the like into the environment. In an aspect, the Biochar for use as a soil amendment is substantially-free or free of polychlorinated dibenzo-p-dioxins (PCDD) and polychlorinated dibenzofurans (PCDF). Unlike conversional pyrolysis and/or combustion processes the methods of the invention do not result in PCDD/PCDF concentrations in the Biochar even if metal sources and/or chlorine are included in the treated wood waste source, overcoming a significant limitation of the state of the art. This is a significant advancement as it is undesirable to have any dioxins or other hazardous or toxic materials in Biochar used for a soil amendment (or other use) as the toxins would be bound to the carbon matrix and ultimately would become pollutants as the carbon-rich material has a high sorption affinity for hydrophobic organic pollutants, such as herbicides and pesticides. This is undesirable as dioxins have a long half-live in biochar materials and thereby provides an avenue for entry of dioxins or other hazardous or toxic materials into food materials as plant roots can take up the materials from a biochar or the surrounding soil.

Fuel Source

The methods according to the invention employing the thermolysis methods beneficially provide a clean fuel source. As referred to herein, the clean fuel source can include both syngas (i.e. mixture of hydrogen, carbon monoxide, and carbon dioxide) and biofuel. In an aspect, the fuel gas source is a clean, non-hazardous material. In an aspect, the fuel gas source is substantially-free of toxic chemicals. In an aspect, the fuel gas source is substantially-free of halogen compounds. In a further aspect, the fuel gas source is substantially-free of or free of toxic chemicals and halogen compounds. In an aspect, the fuel source is substantially-free or free of creosote components, polycyclic aromatic hydrocarbons (PAHs), including chlorine phenols, halogenated dibenzodioxins, halogenated dibenzofurans, biphenyls, and/or pyrenes.

In an embodiment, the fuel gas generated is utilized for heating the reactor(s) for the system and methods of the thermolysis methods of the invention. In an aspect, the heat for the reactor(s) is supplied by about 10-50% of the generated fuel gas, about 10-40% of the generated fuel gas, or about 20-30% of the generated fuel gas.

In an embodiment, the fuel gas generated has a composition substantially as set forth in the Tables in the examples below.

In an aspect, the fuel gas is a superior product because no air or external oxygen introduced into the reactors, such as is common in pyrolysis and/or partial oxidation systems.

In an embodiment of the invention the thermolysis of the untreated wood waste sources (i.e. before thermolysis of the treated wood source comprising wood and at least creosote or other chemical compounds) provide from about 6,000 BTU per pound, from about 6,400 BTU per pound, or up to about 7,700 BTU per pound or greater of the waste source, producing a Clean Fuel Gas as an energy source. Beneficially, in processing of a single railroad tie (i.e. exemplary treated wood waste source) having approximately 20 wt.-% chemical components provide approximately 1.4 million BTU. This unexpectedly high BTU is approximately equivalent to approximately 125 pounds of coal, demonstrating the beneficial effects of processing the treated wood waste sources according to the invention. As one skilled in the art will ascertain based on the disclosure of the invention set forth herein, differences in types of extent of chemical treatment of the wood will impact the BTUs per pound.

In an aspect, the heating value of the generated fuel gas source generated from the treated wood waste source is unexpectedly higher than a wood waste source alone. The inclusion of creosote and the PAH contained therein will add as much as about 5-10% heating value in comparison to the wood alone. In an aspect, notably, the evaluated fuel gas met all emission requirements evaluated. In an aspect, the generation of the fuel gas is suitable for various applications of use. In an embodiment, the generated fuel source can be used to generate electricity using engines or gas turbines to power a manufacturing plant and/or boiler as a replacement for natural gas and/or electricity. In another aspect, the fuel gas can be used for burners, or steam and electricity production and/or distribution. Many examples of such uses are well known to practitioners of the art.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The disclosure of each reference set forth herein this patent application is incorporated herein by reference in its entirety.

Example 1

Systems and Apparatus for Processing Treated Wood.

Apparatus and processing system for treated wood waste sources were evaluated at a pilot plant in Forst, Germany for the assessment of product features and material balances as disclosed pursuant to the embodiments of the invention. The methods according to the invention were evaluated to confirm gas output having a suitable composition with high methane, hydrogen and carbon monoxide content for further usage, and all toxic chemical compounds were removed (and no other toxins generated) by the thermolysis system. The methods according to the invention were evaluated to confirm complete destruction of VOCs and other toxic components, along with the measurement of any potentially hazardous components and VOCs to assess suitability of the processes for use in factories. The mass balances were also assessed to determine whether the resulting Biochar can be safely utilized as a soil amendment.

Description of the input material. The material was waste wood, which contained creosote as a pollutant. The wood also contained utility poles which had PCP, CCA and other preservatives. Metal parts were also included, e.g. eyelets for transport ropes and screws. An attempt was made to eliminate the metal parts before feeding them into the plant. Due to the creosote load, the material was very odor-intensive. The density of the material corresponded to that of wood. The humidity was over 20%. Due to the coarse material, which was strongly compressed during conveying, the residual material remaining in the reactor and system from previous experiments was removed and carried along. The metals and other residues in these material residues which cannot be chemically converted are discharged mixed with the resulting coke. This means that the discharge of residual residues from the previous tests must be taken into account when assessing the coke analyses. The material handling for the test was coordinated with the customer and the infeed technology for the test was adjusted. After start-up of the plant, continuous plant operation was carried out with step-by-step material feed in measured quantities and periodic product removal.

Parameters of the Test Operation.

Railroad ties at 'end of life' (average of 40 years or more of age) were obtained for evaluation. The feedstock had been shredded to <2 inches for the test. The reactor substantially as depicted in FIG. 1 had been cleaned before the test. Process software and sensors were adjusted to record the operating conditions. The material handling and infeed conditions were adjusted before the test. Technical adjustments for this specific feedstock were implemented as outlined below.

Continuous Processing.

A continuous plant operation was conducted after heating the system up with controlled feedstock input and product discharge. The operating parameters were adjusted to the requirements of the feedstock. The resulting materials and media were sampled and documented. A total of two gas samples, a feedstock sample from each feedstock type and a Biochar sample were obtained for further analysis. The analysis of the samples was carried out by a certified independent laboratory.

General Conditions.

The feedstock had been shredded and was fed according to the test protocol. The start-up process included the heating of the reactors and the adjustments of the gas scrubbing units and adjacent plant components. The operating conditions were adjusted to the test plant as outlined below.

Plant Conditions.

The plant operation during the test used the standard configuration of the system and used specific adjustments for this feedstock—These adjustments included:

Plant operation with the lower (one) burner only;

Feedstock infeed as infeed chamber emptied (although this would not be a required limitation in a commercial size plant employing the methods and processes of the invention);

Reactor conditions with temperatures of 450° C. to 800° C. at the reactor top and 400° C. to 800° C. at the lower parts of the reactor;

Pressure levels of the system was increased between 5 mbar and 100 mbar;

Steam generation via heat exchanger and injection of the process steam through pipelines directly into the reactor head to increase moisture content to about 10% to improve gasification process of the low-density input by increasing moisture content of the feedstock;

Cracker-module for generated condensates (e.g. light oils) was not in operation, because the volume of these oils was too low for an efficient operation;

The product gas was piped from the reactor to the gas cleaning units;

The condensates were scrubbed out in the gas cleaning units from the generated gas. Oily components (oligomers) were generated from both feedstock samples, which were completely condensed in scrubbing unit 2. The oily components from the wood feedstock passed through Scrubber 1 due to its operating conditions. A small fraction of the oily components from the feedstock was scrubbed out in unit 1. A decrease in the scrubbing media temperature is required to achieve a nearly complete condensation of these components in Scrubber 1. The condensates show a high density due to a high fraction of oligomers. No oily components were recorded in Scrubber 3 and only water from the gas fraction was condensed in Scrubber 3. The control valves in the gas piping system recorded also no condensates from the gas. The gas cleaning operational parameters and conditions were not changed for both tests and the system operated as expected.

Water was added to gas scrubber 1 although level equalization was not required, and controlled oil separation and condensation occurred); and The operation of the gas scrubbers was carried out without recirculation; Level control in scrubber 1 and 2 by manual adjustments of the correct level; and Control of the oil water separator between the scrubbers and the gas pipeline of the plant during operation.

No recirculation and injection of the generated oils from scrubbers 1 and 2. The low amount of oil components was removed from scrubbers 1 and 2 and collected.

The level control of the media during operation were adjusted constantly to its range level. Media in the first scrubber: oil, Media in the following scrubbers: water with additives. All generated media were removed after the test and measured for the mass balance.

Analysis Methods.

The feedstock material and the Biochar were sampled. The gas samples were collected in glass probes and shipped for analysis to an external certified laboratory. Only small volumes of oil-oligomers-tar mixture were created at the selected temperatures for the gasification of the wood crosstie and pole feedstocks and were removed after scrubbing. The mixture is separated by an internal oil-water separator and the light fraction will be converted to gas in the cracking reactor, the heavy fraction with the tars piped into the bottom of the first reactor for reprocessing in a commercial unit.

Test Results.

Table 2 shows the summary input during the test.

TABLE 2

| Standard plant operation | |
| --- | --- |
| Total Input | 170 kg |
| Average throughput | 34 kg/hr. |

Figure 5:
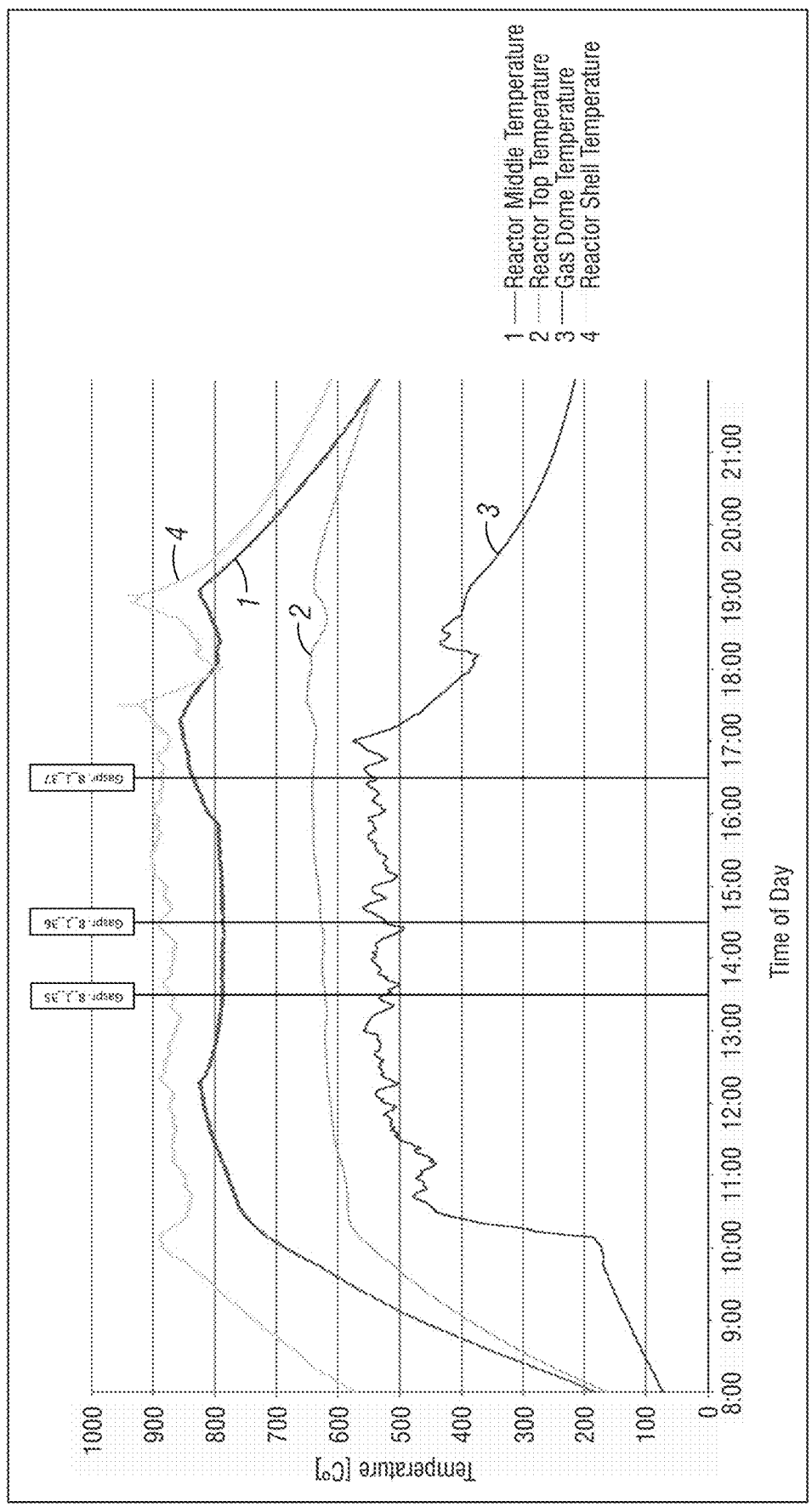
FIG. 5 shows temperature measurements from treated wood waste sources for processing according to the methods, systems, and/or processes of the present invention.

Temperature data for the temperature of the reaction from the start of the processing to the end of the test is depicted in FIG. 5. The temperature measurements (measured in degrees Celsius) show the temperatures in different parts of reactor (e.g. middle reactor, top of the reactor, gas dome of reactor and the reactor shell). The samples at various times provide an average temperature of the reaction.

Figure 6:
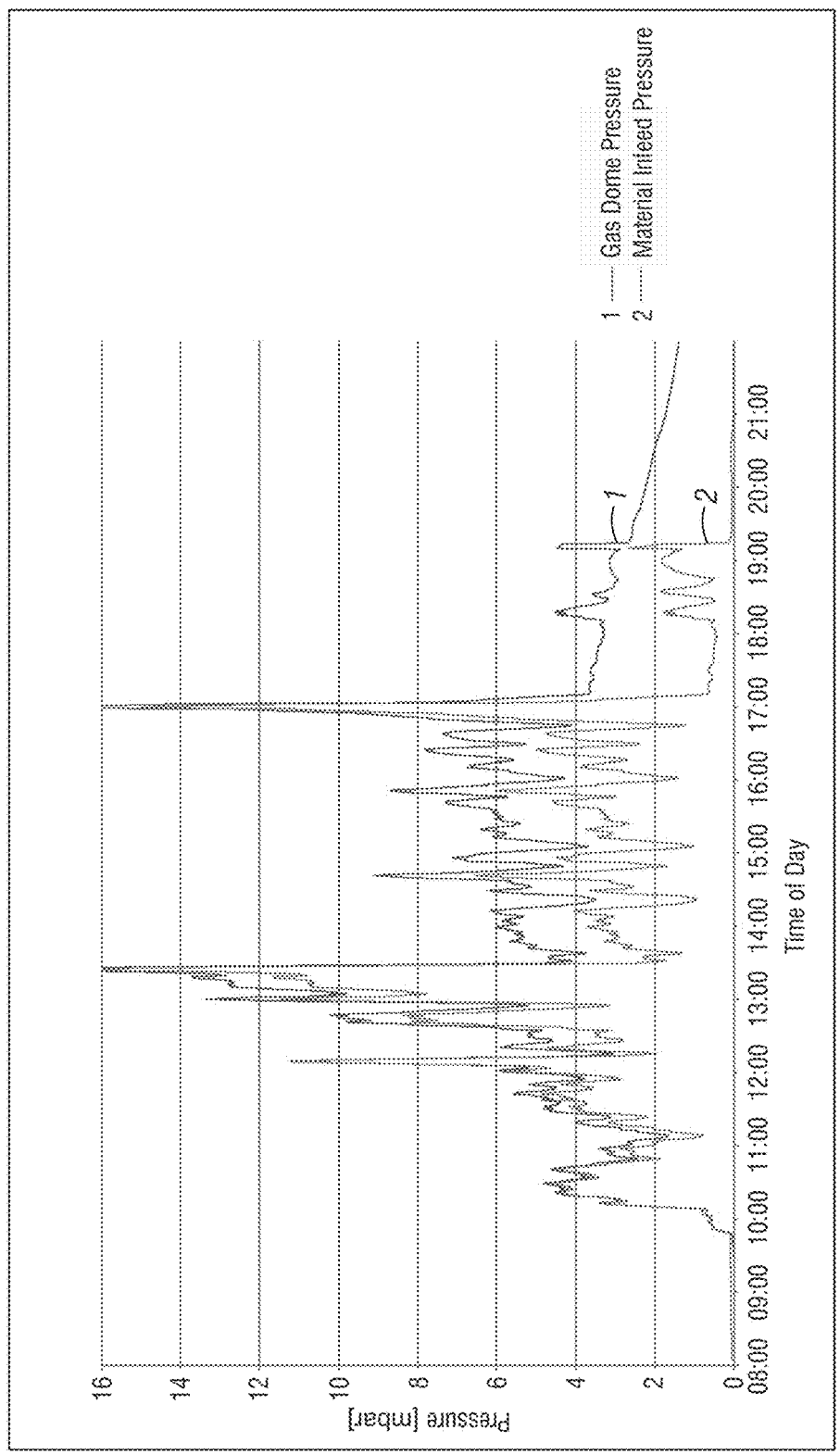
FIG. 6 shows pressure measurements from treated wood waste sources for processing according to the methods, systems, and/or processes of the present invention.

As the treated wood waste sources do not have a large amount of fine particles in the feedstock there is not an immediate gasification in the reactor—this is shown in FIG. 6 by no immediate (short term) pressure spikes inside the reactor immediately after feeding new material. FIG. 6 instead shows the varying fluctuations in pressure by the varying amounts of material entering the reactor. Notably, the pressures are low, approximately 0.2 PSI at the highest pressure measurement (16 millibar is equal to 0.23 PSI). The pressures measured are at the gas dome and the material Infeed (material entrance into the main reactor).

TABLE 3

| | Input | | Output | | | |
| --- | --- | --- | --- | --- | --- | --- |
| | Input | Steam | Gas | Oils and tars | Char | Water |
| Mass [kg] | 170 kg Input, incl. 39.5 kg Water (Moisture) | 22.5 | 89 | Fed back to Cracker | 38 | 60 |

The balance sheet shown in Table 3 shows a deficit due to minor errors in the measurement data. The quantity of gas produced is approximately 50% of the input quantity of the moist material. Related to the mass of wood without moisture content (dry basis), the value is approx. 65%. From the moisture of the material a part of the coke was converted into product gas. The analysis of gas is shown in Table 4 where the gas samples were taken at different times during the testing to show an "average" gas composition for the test. These values serve to provide the energy content of the syngas (i.e. its heating value).

TABLE 4

| Main components [Vol-%] | Gas_8_1_35 | Gas_8_1_36 | Gas_8_1_37 |
| --- | --- | --- | --- |
| $H_2$ | 28.5 | 27.3 | 43.0 |
| $O_2$ | 0.22 | 0.41 | 0.38 |
| $N_2$ | 0.86 | 2.0 | 1.3 |
| $CH_4$ | 14.6 | 13.8 | 12.2 |
| CO | 29.4 | 33.5 | 22.8 |
| $CO_2$ | 20.3 | 17.0 | 16.5 |

TABLE 4-continued

| Main components [Vol-%] | Gas_8_1_35 | Gas_8_1_36 | Gas_8_1_37 |
|---|---|---|---|
| Ethane | 0.97 | 1.0 | 0.39 |
| Ethene | 2.7 | 2.6 | 1.4 |
| Propane | 0.26 | 0.26 | 0.1 |
| Propene | 2.1 | 2.0 | 1.8 |
| i-Butane | <0.01 | <0.01 | <0.01 |
| n-Butane | <0.1 | <0.1 | <0.1 |
| Mol weight | 22.5 | 22.4 | 18.4 |
| Density [kg/m$^3$] | 1.0 | 1.0 | 0.8 |
| Heating value [kWh/m$^3$] | 4.6 | 4.6 | 4.1 |
| Wobbe Index [kWh/m$^3$] | 5.2 | 5.2 | 5.1 |

Analysis of the Biochar was also conducted to ensure it is substantially-free of polycyclic aromatic hydrocarbons, dioxins and furans. This is shown in Table 5 and Table 6.

TABLE 5

| | Units ng/kg Dry substance | | | |
|---|---|---|---|---|
| PCDD/F | Concentration | I-TEF | I-TEQ | BG |
| 2,3,7,8-TCDD* | <2 | 1.00 | 2.00 | 1 |
| 1,2,3,7,8-PeCDD* | <3 | 0.50 | 1.50 | 1 |
| 1,2,3,4,7,8-HxCDD | <1 | 0.10 | 0.10 | 1 |
| 1,2,3,6,7,8-HxCDD | <1 | 0.10 | 0.10 | 1 |
| 1,2,3,7,8,9-HxCDD | <1 | 0.10 | 0.10 | 1 |
| 1,2,3,4,6,7,8-HpCDD | <5 | 0.01 | 0.05 | 5 |
| OCDD | <10 | 0.001 | 0.01 | 10 |
| 2,3,7,8-TCDF | <1 | 0.10 | 0.10 | 1 |
| 1,2,3,7,8-PeCDF | <1 | 0.05 | 0.05 | 1 |
| 2,3,4,7,8-PeCDF | <1 | 0.50 | 0.50 | 1 |
| 1,2,3,4,7,8-HxCDF | <1 | 0.10 | 0.10 | 1 |
| 1,2,3,6,7,8-HxCDF | <1 | 0.10 | 0.10 | 1 |
| 1,2,3,7,8,9-HxCDF | <1 | 0.10 | 0.10 | 1 |
| 2,3,4,6,7,8-HxCDF* | <2 | 0.10 | 0.20 | 1 |
| 1,2,3,4,6,7,8-HpCDF* | <6 | 0.01 | 0.06 | 3 |
| 1,2,3,4,7,8,9-HpCDF | <3 | 0.01 | 0.03 | 3 |
| OCDF | <10 | 0.001 | 0.01 | 10 |

I-TEQ (NATO-CCMS) inclusive 100% BG PCDD/F 5,110 ng/kg Dry substance
*Increase BG due to matrix effects

TABLE 6

| Measurement Parameter | Analysis | Unit |
|---|---|---|
| Water | 0.5 | Ma.-% |
| Sulfur. Total raw | 0.09 | Ma.-% |
| Sulfur. total wf. | 0.09 | Ma.-% |
| Chlorine. raw | 1500 | mg/kg |
| Chlorine. WF. | 1500 | mg/kg |
| Ultrasound extraction | | |
| Naphthalene | 3.1 | mg/kg TR |
| Acenaphthylene | 0.43 | mg/kg TR |
| Acenaphthene | 0.23 | mg/kg TR |
| Fluorene | 0.12 | mg/kg TR |
| Phenanthrene | 0.77 | mg/kg TR |
| Anthracene | 0.046 | mg/kg TR |
| Fluoranthene | 0.25 | mg/kg TR |
| Pyrene | 0.24 | mg/kg TR |
| Benzo(a)anthracene | <0.030 | mg/kg TR |
| Chrysene | <0.030 | mg/kg TR |
| Benzo(b)fluoranthene | <0.030 | mg/kg TR |
| Benzo(k)fluoranthene | <0.010 | mg/kg TR |
| Benzo(a)pyrene | <0.030 | ma/kg TR |
| Dibenzo(a.h)anthracene | <0.030 | mg/kg TR |
| Benzo(g.h.i)perylene | <0.030 | mg/kg TR |
| Indenopyrene | <0.050 | mg/kg TR |
| SUM PAH (EPA) | 5.2 | mg/kg TR |
| Sum PCB (6) | <0.02 | mg/kg TR |

TABLE 6-continued

| Measurement Parameter | Analysis | Unit |
|---|---|---|
| Cooperation services | | |
| Arsenic | 1010 | mg/kg TR |
| Cadmium | 2.69 | mg/kg TR |
| Chromium. Total | 935 | mg/kg TR |
| Cobalt | 24.2 | mg/kg TR |
| Copper | 5940 | mg/kg TR |
| Lead | 591 | mg/kg TR |
| Molybdenum | 11.4 | mg/kg TR |
| Mercury | 0.24 | mg/kg TR |
| Nickel | 175 | mg/kg TR |
| Selenium | <2 | mg/kg TR |
| Zinc | 7970 | mg/kg TR |
| Boron | 831 | mg/kg TR |
| Iron | 33800 | mg/kg TR |
| Manganese | 493 | mg/kg TR |
| Sodium | 1250 | mg/kg TR |

Summary of Apparatus and Process Set-Up.

The Input feedstock is being fed quasi-continuously by heated screw conveyors. The feedstock reacts quickly in the main reactor at these temperature conditions and gasifies rapidly. This gasification profile was monitored by the pressure increase shortly after the feedstock was fed into the system. The observed pressure increase is not critical and can be equalized by a more constant feedstock input for a commercial size unit. Beneficially, the gasification and reaction speed of the tested feedstock described herein enables a high throughput volume. The generated gas is piped from the reactor into the gas scrubbing units, which remove the condensates from the gas stream. The condensates are then collected in scrubber 1 and 2 and their viscosity is suitable for reinjection into the process as a fuel source. Residual tars are not left over in the scrubbers.

Overall Results.

The plant operation with the delivered feedstock was successful. The technical design of the pilot plant demonstrated the desired processing. A gas for multiple applications has been generated and a Biochar suitable for further processing was obtained. Further benefits include the confirmation that no dioxins generated, and existing dioxins cracked, confirming reduction to practice of not creating any toxic materials.

Example 2

Test of Utility Poles

The test was carried out with utility poles. The material handling for the test was coordinated and the infeed technology for the test was adjusted for the new, larger material. As before, the operating setting corresponded to the standard technology. During the trial with the utility pole material, the trial operation had to be interrupted because the material had compacted during drying due to particles that were too large in the screw conveyors and the trial had to be stopped after an initially good system operation. However, these material properties could not be detected by the sifting alone before the test but had to be determined during the test. After eliminating the resulting malfunction and shredding the delivered material to less than 2 inches, the test was continued in the subsequent plant operation, the material was processed, coke and gas produced, and the operating data determined.

In this trial, the trial operation was carried out with positive results after these measures had been taken. However, the dioxin levels were too high because air had entered the process due to the malfunction. At least the results show that in case of non-compliance with the technology, depending on the type of intervention, dioxins are formed which do not occur during regular plant operation and can even be eliminated, as the first experiment showed.

Plant Operation as in the Preceding Test

Reactor operation at temperatures of approximately 680° C., temperatures in the head area 500° C. to 600° C., temperatures in the center of the frame 660 to 680° C., gas outlet from the gas dome to the first scrubber. Steam generation by means of heat exchangers for pressurizing the reactor with steam via branch lines at the head. The cracker module for feeding in the resulting condensate quantities is in operation from 1 pm, the low-viscosity condensates mixed with water from the first scrubber are used. The volatile condensates produced in the second scrubber are fed into the first scrubber within the gas scrubber.

Sampling, Analyses, Explanations

The input material and the coke were sampled and analyzed as specified. The product gas was also sampled and analyzed by three random samples. There are reserve samples of input material and coke, which can be further analyzed if necessary. Sampling was carried out as in the experiment already described. Special features regarding sampling and analysis have not occurred.

The shredded material was added continuously in short material batches after the reactor had been brought to operating temperature, for example. Water vapor was fed in as a medium during operation. The excess condensates were removed from the scrubbers or coke from the coke screw apparatus. Table 7 shows the input and throughput of the testing.

TABLE 7

| Plant operation in standard process | |
|---|---|
| Use quantity, material input when testing (in the first partial test at the 29.08.2018, approx. 80 kg were used) | 110 kg |
| Average throughput | 24 kg/hr. |

Figure 7:
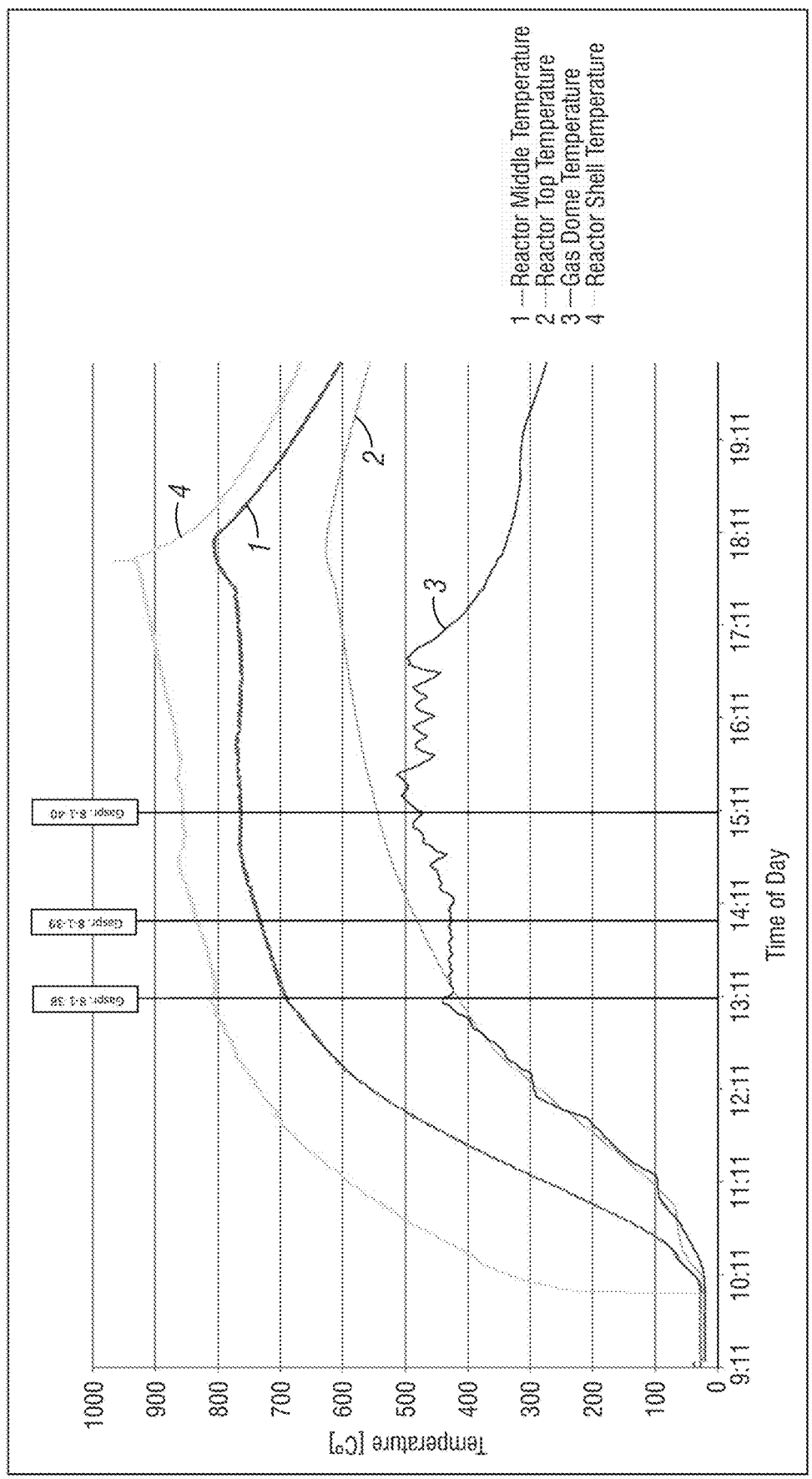
FIG. 7 shows temperature measurements from treated wood waste sources for processing according to the methods, systems, and/or processes of the present invention.
Figure 8:
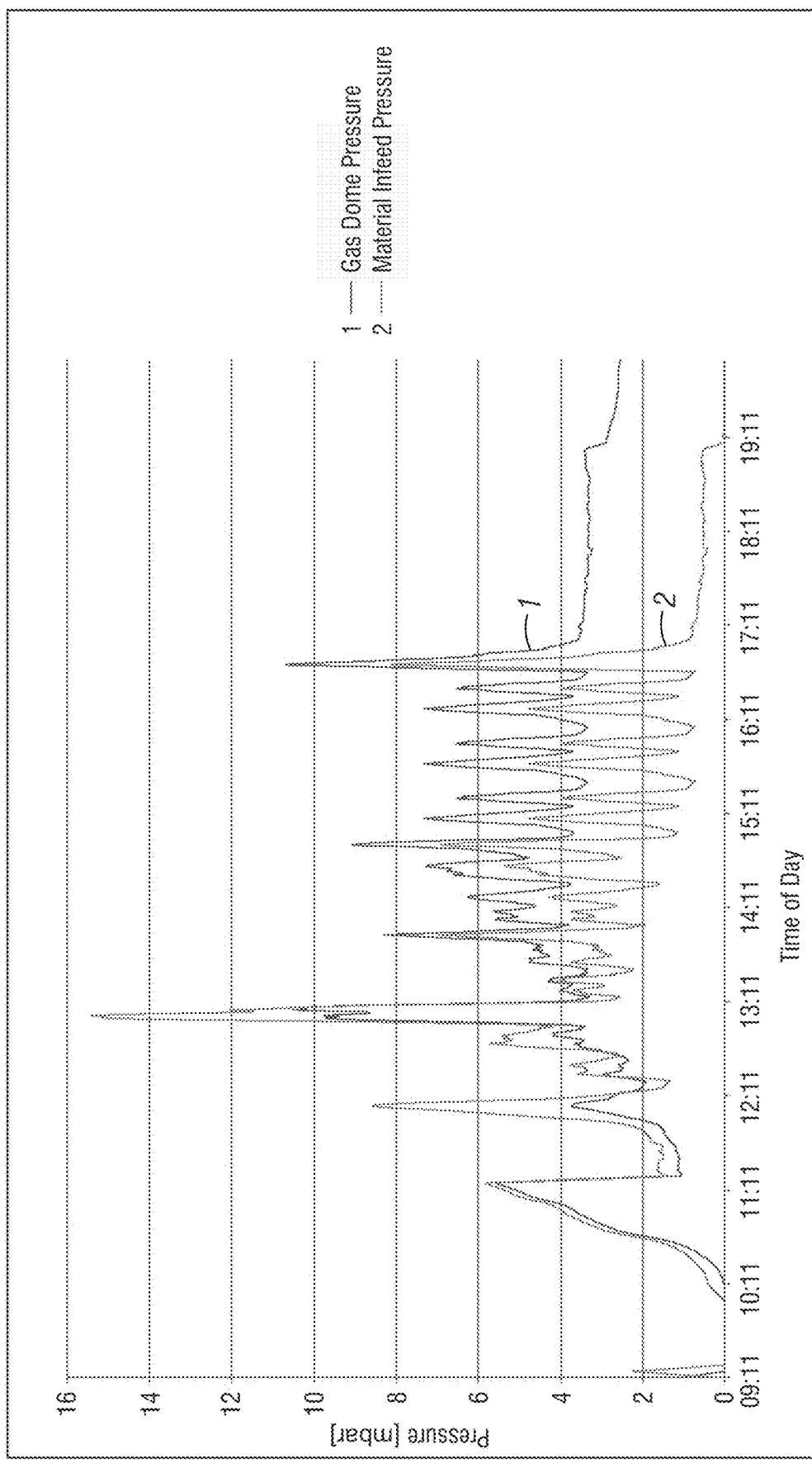
FIG. 8 shows pressure measurements from treated wood waste sources for processing according to the methods, systems, and/or processes of the present invention.

Temperature conditions of the reaction are shown in FIG. 7. throughout the reaction with the timing of the gas samples shown in the 3 vertical lines. The measured values of pressure in the reactor are shown in FIG. 8. The temperature and pressure measurements were done according to the same methodology of the initial testing.

Explanation of the measured values and measured data.

The plant was operated with a reactor in a temperature range of 600° C. to 800° C. The reactor was operated in a temperature range of 600° C. to 800° C. The temperature indicated as the gas temperature was measured outside the reactor in the gas pipe at the dome. The mean slight temperature increase over the course of the test for the special material essentially provides information about the reactivity of the reaction mixture in the reactor at the current level. The temperature characteristic curves indicate the temperatures at certain points in the reactor. The characteristic curves show the process flow. An externally recorded temperature curve indicates the measured values of an additional sensor installed in the lower reactor interior. These were between 480° C. and 520° C. during plant operation. The initial phase is characterized by the fact that material from the previous test, which had to be stopped, was already lying in the reactor or had to be fed through the tests of the screw conveyors after the blockage had been removed. The course of the temperature rise reflects this atypical phase with the gasification of fed material and a large quantity of material in the lower reactor chamber. The average pressure in the product chamber at the base value was 2 to 4 mbar. The higher peaks are due to the production processes in the post-reactor, which are carried out in phases. In order to prepare the gasification of the coke after the renewed feeding, in the last test phase the discharge was carried out with longer conveying phases. This resulted in stronger peaks in the pressure curve during this phase. The smaller peaks of the pressure curve characterize the batch-wise feeding of material into the reactor. These pressure peaks, which are however unproblematic, can be prevented by evenly distributing the conveying process and avoiding batch-wise conveying. The strongest peaks above 8 mbar are due to measurement activities. After completion of the first test phase, the coke discharged was returned to the reactor as agreed. Gas formation was no longer to be expected in this phase, but the residence time of the coke in the reactor was increased. The temperature and pressure curves take this mode of operation of the system into account.

The evaluation of the measurement data shows a normal test procedure with the described settings. In the scrubbers, temperatures in the first scrubber were set at approx. 65° C., in the second scrubber at 30° C. and in the third scrubber also at 30° C. No media were refilled during operation, but they were drained to maintain the filling level. In scrubbers 1 and 2 only small amounts of light oils were condensed. The light oils were transferred to scrubber 1 and from there fed back into the reactor.

Analyses and balance sheets are shown in Table 8.

TABLE 8

| | Input | | Output | | |
|---|---|---|---|---|---|
| | Input | Steam | Gas | Condensed oil | Coke | Water |
| Mass [kg] | 110 kg Input, about 16.5 kg Water (Moist) | 10 | 63 | Fed back | 23 | 25 |

Analysis of product gas are shown in Table 9.

TABLE 9

| Main Components [Vol-%] | Gas_8_1_38 | Gas_8_1_39 | Gas_8_1_40 |
|---|---|---|---|
| $H_2$ | 31.7 | 28.8 | 33.2 |
| $O_2$ | 0.50 | 0.96 | 1.2 |
| $N_2$ | 1.0 | 3.2 | 3.7 |
| $CH_4$ | 16.6 | 14.1 | 12.5 |
| CO | 21.8 | 24.9 | 22.1 |
| $CO_2$ | 20.4 | 19.1 | 18.9 |
| Ethane | 0.88 | 1.0 | 0.81 |
| Ethene | 1.2 | 1.7 | 1.6 |
| Propane | 0.43 | 0.45 | 0.48 |
| Propene | 3.5 | 2.7 | 0.2 |
| i-Butane | <0.01 | <0.01 | <0.01 |
| n-Butane | 0.4 | 0.4 | 0.3 |
| Molecular Weight | 21.7 | 22.4 | 20.8 |
| Density [kg/m$^3$] | 1.0 | 1.0 | 0.9 |
| Calorific Value [kWh/m$^3$] | 4.9 | 4.6 | 3.9 |
| Wobbe Index [kWh/m$^3$] | 5.7 | 5.3 | 4.6 |

Analysis of the Biochar was also conducted to ensure it is substantially-free of polycyclic aromatic hydrocarbons, dioxins and furans. This is shown in Table 10 and Table 11.

TABLE 10

Units ng/kg Dry substance

| PCDD/F | Concentration | I-TEF | I-TEQ | BG |
|---|---|---|---|---|
| 2,3,7,8-TCDD | <2 | 1.00 | 2.00 | 1 |
| 1,2,3,7,8-PeCDD | <3 | 0.50 | 1.50 | 1 |
| 1,2,3,4,7,8-HxCDD | <1 | 0.10 | 0.10 | 1 |
| 1,2,3,6,7,8-HxCDD | <1 | 0.10 | 0.10 | 1 |
| 1,2,3,7,8,9-HxCDD | <1 | 0.10 | 0.10 | 1 |
| 1,2,3,4,6,7,8-HpCDD | <5 | 0.01 | 0.05 | 5 |
| OCDD | <10 | 0.001 | 0.01 | 10 |
| 2,3,7,8-TCDF | <1 | 0.10 | 0.10 | 1 |
| 1,2,3,7,8-PeCDF | <1 | 0.05 | 0.05 | 1 |
| 2,3,4,7,8-PeCDF | <1 | 0.50 | 0.50 | 1 |
| 1,2,3,4,7,8-HxCDF | <1 | 0.10 | 0.10 | 1 |
| 1,2,3,6,7,8-HxCDF | <1 | 0.10 | 0.10 | 1 |
| 1,2,3,7,8,9-HxCDF | <1 | 0.10 | 0.10 | 1 |
| 2,3,4,6,7,8-HxCDF | <2 | 0.10 | 0.20 | 1 |
| 1,2,3,4,6,7,8-HpCDF | <6 | 0.01 | 0.06 | 3 |
| 1,2,3,4,7,8,9-HpCDF | <3 | 0.01 | 0.03 | 3 |
| OCDF | <10 | 0.001 | 0.01 | 10 |

I-TEQ (NATO-CCMS) inclusive 100% BG PCDD/F 5,110 ng/kg Dry substance

TABLE 11

| Measurement Parameter | Analysis Value | Dimension |
|---|---|---|
| Dry residue at 40° C. (tr) | 92.2 | Ma.-%[5] |
| Water content | 14.1 | Ma.-% |
| Ash content, raw | 1.85 | Ma. -% |
| Ash content, WF | 2.15 | Ma.-% |
| Carbon, raw | 45.9 | Ma.-% |
| Carbon, WF | 53.4 | Ma.-% |
| Carbon, WAF | 54.6 | Ma.-% |
| Hydrogen, raw | 4.59 | Ma.-% |
| Hydrogen, WF | 5.34 | Ma.-% |
| Hydrogen, WAF | 5.46 | Ma.-% |
| Nitrogen, Raw | 0.03 | Ma.-% |
| Nitrogen, WF | 0.03 | Ma.-% |
| Nitrogen, WAF | 0.03 | Ma.-% |
| Sulfur, Total raw | 0.08 | Ma.-% |
| Sulfur, Total WF | 0.09 | Ma.-% |
| Chlorine, raw | 200 | mg/kg |
| Chlorine, WF | 230 | mg/kg |
| Chlorine, WAF | 240 | mg/kg |
| Calorific value, raw | 17922 | kJ/kg |
| Calorific value, raw | 16580 | kJ/kg |
| Calorific value, WAF | 20140 | kJ/kg |
| Ultrasonic Extraction | | 15 |
| Arsenic | 20.1 | mg/kg TR |
| Cadmium | 0.16 | mg/kg TR |
| Chromium Total | 35.6 | mg/kg TR |
| Cobalt | 3.05 | mg/kg TR |
| Copper | 18.9 | mg/kg TR |
| Lead | 0.51 | mg/kg TR |
| Molybdenum | 2.46 | mg/kg TR |
| Mercury | <0.1 | mg/kg TR |
| Nickel | 6.39 | mg/kg TR |
| Selenium | <1 | mg/kg TR |
| Zinc | 105 | mg/kg TR |
| Boron | 7.56 | mg/kg TR |
| Iron | 2130 | mg/kg TR |
| Manganese | 87.4 | mg/kg TR |
| Sodium | 71.5 | mg/kg TR |

Results.

Plant operation with the type of material used was successfully carried out. The technology, as implemented in the pilot plant, was suitable for the processing of shredded utility poles. A coke mixture (biochar) that can be used for the specified purposes can be produced for further processing.

The coke produced has no pollutants formed during the process, i.e. no dioxins or PCBs have been formed or destroyed if present in the material. The PAH components were well below the limit value. When air enters, as occurred in the second experiment due to the compaction of the material in the screw conveyor, the dioxin values also increase as expected. The pilot plant could be operated stably with the set technology.

The composition of the material leads to the production of a product gas with a calorific value of less than 5 kWh/m$^3$ (483 Btu/ft$^3$). This value is due to the relatively low paraffin values. The density of the gas is high with approx. 1 kg/m$^3$, which is due to the high carbon oxide values. The decrease in the density value in the last analysis is due to the higher hydrogen content.

The results show that both samples were cross-contaminated. The intended waste input source was railroad times; however, a mixture of the crossties and utility poles were provided. Similarly, what was thought to be poles was also a mixture. Accordingly, the Biochar was contaminated with unwanted elements. This is clearly shown by the presence of copper, chromium, arsenic, and zinc in the analytical results. The presence of iron was expected from the crossties. To confirm the analytical results, additional samples were sent to a U.S. testing laboratory that repeated the analysis and provided a comparison to contamination limits established by the International Biochar Institute (IBI). The results confirmed the above data as shown in the following Table 12.

TABLE 12

| Parameter | As Received (avg 2 labs) | Poles (avg 2 labs) | Crossties (avg 2 labs) | IBI Limits | Units |
|---|---|---|---|---|---|
| Chlorine | 475 | 803 | 431 | Declaration | mg/kg |
| PAHS | | 5.2 | 140 | 6 to 300 | mg/kg |
| PCBs | | <0.02 | <0.02 | 0.2 to 1 | mg/kg |
| Surface area | | 178 | 160 | | m$^2$/kg |
| Arsenic | 228 | 4525 | 226 | 13 to 100 | mg/kg |
| Chromium | 320 | 580 | 474 | 93 to 2000 | mg/kg |
| Copper | 163 | 5337 | 6190 | 143 to 6000 | mg/kg |
| Zinc | 204 | 4838 | 12641 | 416 to 7400 | mg/kg |
| Iron | 2195 | 30148 | 20191 | Declaration | mg/kg |

Visual analysis of the Biochar showed that 87 to 97% of the Biochar was smaller than 0.5 mm with 3 to 9% between 0.5 and 1 mm. The material is friable and therefore it can either be further reduced in size or pelletized with commercial processes as required. The surface area averaged 169 m$^2$/g.

Summary of Mixed Sample Tests

The most important factor is that the PCBs have been removed below the level of detection. Secondly, the PAHs have also been removed to levels either below the IBI accepted levels. The sample that fell within the limits had been exposed to air caused by the material jamming in the infeed screw conveyor as noted above. Chlorine from PCP has been controlled to acceptable levels and can be further reduced by modifying the media in the scrubbers. Iron levels are not a significant issue to IBI limits. Copper is at the top limits of IBI concentrations. Zinc is also close and with focused scrubbing that can be handled. The arsenic and chromium must be lowered by treatment of the biochar from utility poles. The removal process for those elements is described elsewhere. Because the surface area of the Biochar averaged about 169 m$^2$/g, treatments with steam or other processes would be necessary to maximize its value. Because the crossties were contaminated with poles, another test using only crossties was conducted.

Example 3

Systems and Apparatus for Processing Treated Railroad Crossties.

Apparatus and processing system for treated scrap crossties sources were evaluated at a pilot plant in Forst, Germany for the assessment of product features and material balances as disclosed pursuant to the embodiments of the invention. The methods according to the invention were evaluated to confirm gas output having a suitable composition with high methane, hydrogen and carbon monoxide content for further usage, and all toxic chemical compounds were removed (and no other toxins generated) by the thermolysis system. The methods according to the invention were evaluated to confirm complete destruction of VOCs and other toxic components, along with the measurement of any potentially hazardous components and VCOs to assess suitability of the processes for use in factories. The mass balances were also assessed to determine whether the resulting Biochar can be safely utilized as a soil amendment. The purpose of this test was to ensure removal of PAHs, PCBs, and to recover creosote.

Description of the Input Material

The material was scrap crossties, which contained creosote as a preservative. Metal parts were also included, e.g. eyelets for transport ropes and screws. An attempt was made to eliminate the metal parts before feeding them into the plant. Due to the creosote load, the material was very odor-intensive. The density of the material corresponded to that of wood. The humidity was over 20%.

General Conditions.

The feedstock had been shredded to <2" size and was fed according to the test protocol. The start-up process included the heating of the reactors and the adjustments of the gas scrubbing units and adjacent plant components. The operating conditions were adjusted to the test plant as outlined below.

Plant Conditions.

The plant operation during the test used the standard configuration of the system and used specific adjustments for this feedstock. These adjustments included:

Plant operation with the lower (one) burner only;

Feedstock infeed as infeed chamber emptied (although this would not be a required limitation in a commercial size plant employing the methods and processes of the invention);

Reactor conditions with temperatures of 250° C. to 550° C. at the reactor top and 200° C. to 800° C. at the lower parts of the reactor; pressure levels of the system were increased between 5 mbar and 100 mbar;

Steam generation via heat exchanger and injection of the process steam through pipelines directly into the reactor head to increase moisture content to about 10% to improve gasification process of the low-density input by increasing moisture content of the feedstock;

Cracker-module for generated condensates (e.g. light oils) was not in operation, because the volume of these oils was too low for an efficient operation;

The product gas was piped from the reactor to the gas cleaning units;

The condensates were scrubbed out in the gas cleaning units from the generated gas. Oily components (oligomers) were generated from both feedstock samples, which were completely condensed in scrubbing unit 2. The oily components from the feedstock passed through Scrubber 1 due to its operating conditions. A small fraction of the oily components from the feedstock was scrubbed out in unit 1.

A decrease in the scrubbing media temperature is required to achieve a nearly complete condensation of these components in Scrubber 1. The condensates show a high density due to a high fraction of oligomers. No oily components were recorded in Scrubber 3 and only water from the gas fraction was condensed in Scrubber 3. The control valves in the gas piping system recorded also no condensates from the gas. The gas cleaning operational parameters and conditions were not changed for both tests and the system operated as expected.

Water was added to gas scrubber 1 although level equalization was not required, and controlled oil separation and condensation occurred). The operation of the gas scrubbers was carried out without recirculation; Level control in scrubber 1 and 2 by manual adjustments of the correct level; and Control of the oil water separator between the scrubbers and the gas pipeline of the plant during operation.

No recirculation and injection of the generated oils from scrubbers 1 and 2. The low amount of oil components was removed from scrubbers 1 and 2 and collected. The level control of the media during operation were adjusted constantly to its range level. Media in the first scrubber: oil, media in the following scrubbers: water with additives. All generated media were removed after the test and measured for the mass balance.

Analysis Methods.

The feedstock material and the Biochar were sampled according to standard guidelines. Only small volumes of oil-oligomers-tar mixture were created at the selected temperatures for the gasification of the wood crosstie and pole feedstocks and were removed after scrubbing. The mixture is separated by an internal oil-water separator and the light fraction will be converted to gas in the cracking reactor, the heavy fraction with the tars piped into the bottom of the first reactor for reprocessing in a commercial unit.

Figure 10:
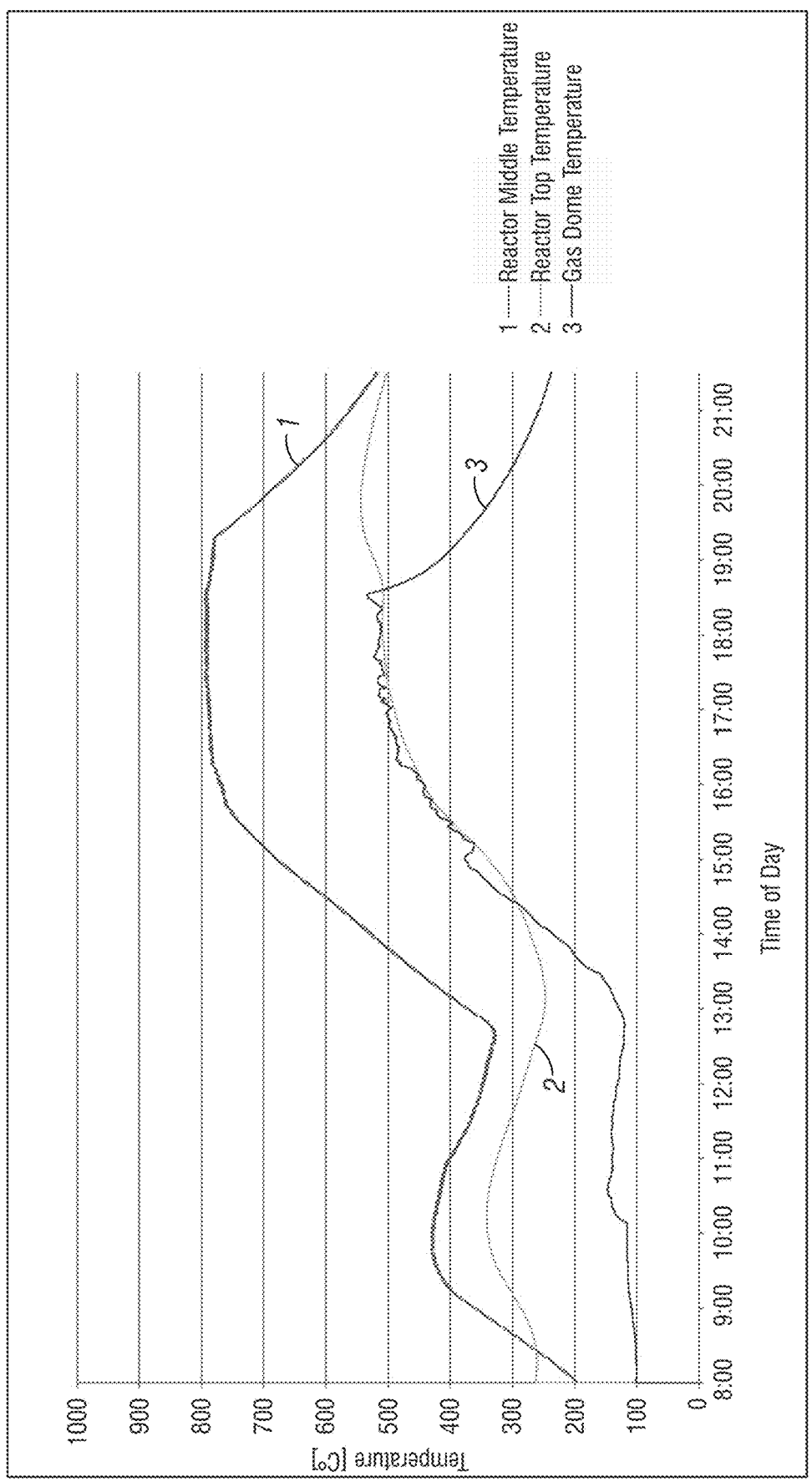
FIG. 10 shows temperature measurements from treated wood waste sources for recovering creosote according to the methods, systems, and/or processes of the present invention.

Test Results:

The reactor temperature profile is shown in FIG. 10 where the temperature #2 line shows the temperature at the top of the reactor which ranged from 250° C. to 350° C. to simulate the conditions needed to evolve the creosote for recovery. Samples were recovered for analysis. Such a creosote recovery chamber would be located externally to the reactor system to enable recovery without affecting the internal reactor conditions needed for quality biochar production. Subsequently, the reactor middle temperature was increased from 325° C. to 800° C. for biochar production and recovery.

Additional testing for pressure profiles, further analytical results and biochar analyses were further completed with test results not available at the time of filing.

Example 4

Systems and Apparatus for Processing Treated Railroad Crossties.

Apparatus and processing system for treated scrap crossties were evaluated at a pilot plant in Forst, Germany for the assessment of product features and material balances as disclosed pursuant to the embodiments of the invention. The methods according to the invention were evaluated to confirm gas output having a suitable composition with high methane, hydrogen and carbon monoxide content for further usage, and all toxic chemical compounds were removed (and no other toxins generated) by the thermolysis system. The methods according to the invention were evaluated to confirm complete destruction of VOCs and other toxic components, along with the measurement of any potentially hazardous components and VCOs to assess suitability of the processes for use in factories. The mass balances were also assessed to determine whether the resulting Biochar can be safely utilized as a soil amendment. The purpose of this test was to process the shredded ties at a range of temperatures to evaluate the quality and purity of the Biochar produces.

Description of the Input Material.

The material was scrap crossties, which contained creosote as a preservative. Metal parts were also included, e.g. eyelets for transport ropes and screws. An attempt was made to eliminate the metal parts before feeding them into the plant. Due to the creosote load, the material was very odor-intensive. The density of the material corresponded to that of wood. The humidity was over 20%.

General Conditions.

The feedstock had been shredded to <2" size and was fed according to the test protocol. The start-up process included the heating of the reactors and the adjustments of the gas scrubbing units and adjacent plant components. The operating conditions were adjusted to the test plant as outlined below.

Plant Conditions.

The plant operation during the test used the standard configuration of the system and used specific adjustments for this feedstock. These adjustments included: Plant operation with the lower (one) burner only; feedstock infeed as infeed chamber emptied (although this would not be a required limitation in a commercial size plant employing the methods and processes of the invention); reactor conditions with temperatures of 250° C. to 850° C. at the reactor top and 200° C. to 850° C. at the lower parts of the reactor; pressure levels of the system were increased between 5 mbar and 100 mbar.

Steam generation via heat exchanger and injection of the process steam through pipelines directly into the reactor head to increase moisture content to about 10% to improve gasification process of the low-density input by increasing moisture content of the feedstock; cracker-module for generated condensates (e.g. light oils) was not in operation, because the volume of these oils was too low for an efficient operation; the product gas was piped from the reactor to the gas cleaning units.

The condensates were scrubbed out in the gas cleaning units from the generated gas. Oily components (oligomers) were generated from both feedstock samples, which were completely condensed in scrubbing unit 2. The oily components from the feedstock passed through Scrubber 1 due to its operating conditions. A small fraction of the oily components from the feedstock was scrubbed out in unit 1. A decrease in the scrubbing media temperature is required to achieve a nearly complete condensation of these components in Scrubber 1. The condensates show a high density due to a high fraction of oligomers. No oily components were recorded in Scrubber 3 and only water from the gas fraction was condensed in Scrubber 3. The control valves in the gas piping system recorded also no condensates from the gas. The gas cleaning operational parameters and conditions were not changed for both tests and the system operated as expected.

Water was added to gas scrubber 1 although level equalization was not required, and controlled oil separation and condensation occurred). The operation of the gas scrubbers was carried out without recirculation; Level control in scrubber 1 and 2 by manual adjustments of the correct level; and Control of the oil water separator between the scrubbers and the gas pipeline of the plant during operation.

No recirculation and injection of the generated oils from scrubbers 1 and 2. The low amount of oil components was removed from scrubbers 1 and 2 and collected. The level control of the media during operation were adjusted constantly to its range level. Media in the first scrubber: oil, media in the following scrubbers: water with additives. All generated media were removed after the test and measured for the mass balance.

Analysis Methods.

The feedstock material and the Biochar were sampled according to standard guidelines. Only small volumes of oil-oligomers-tar mixture were created at the selected temperatures for the gasification of the wood crosstie and utility pole feedstocks and were removed after scrubbing. The mixture is separated by an internal oil-water separator and the light fraction will be converted to gas in the cracking reactor, the heavy fraction with the tars piped into the bottom of the first reactor for reprocessing in a commercial unit.

Figure 9:
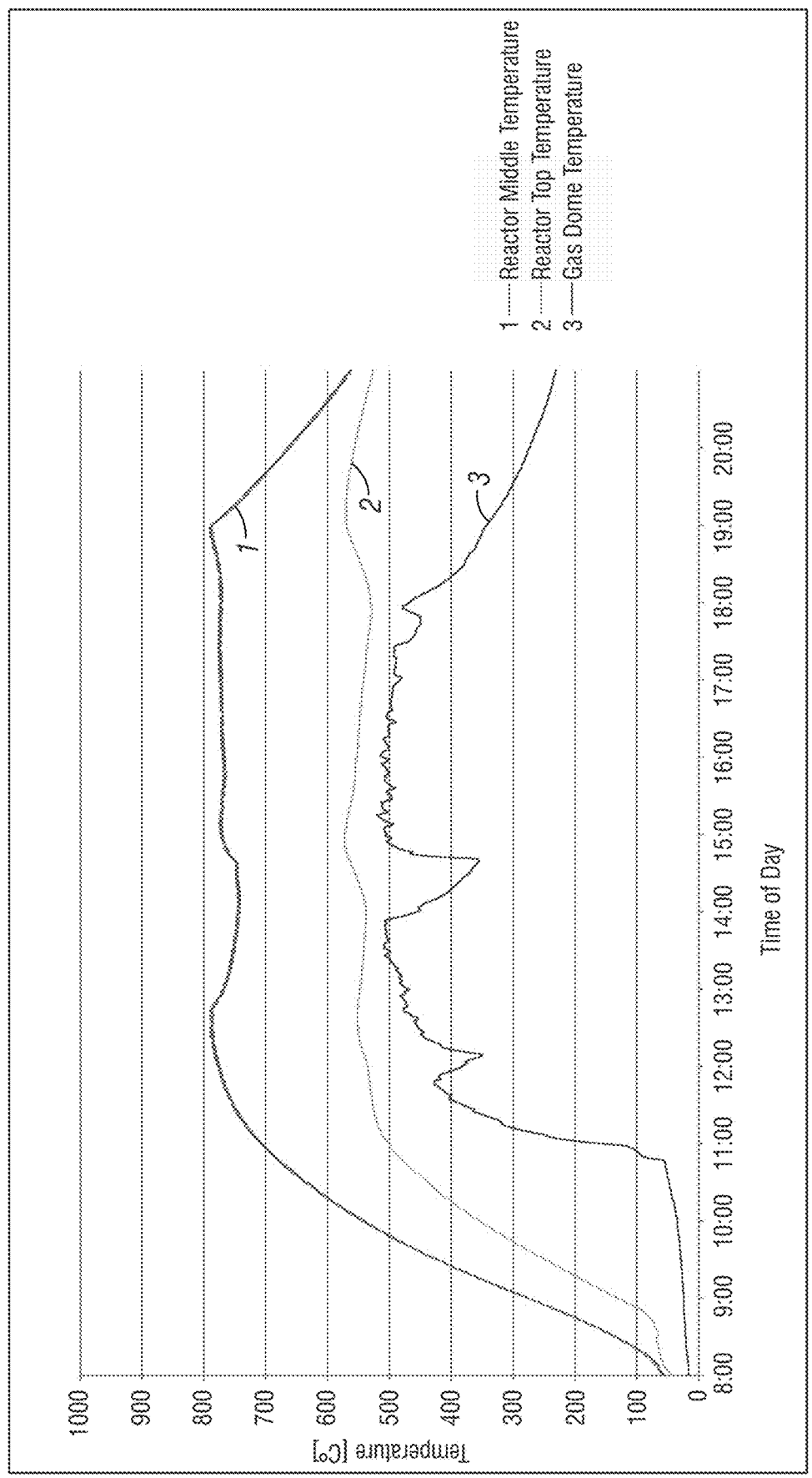
FIG. 9 shows temperature measurements from treated wood waste sources for processing biochar according to the methods, systems, and/or processes of the present invention.
Figure 11:
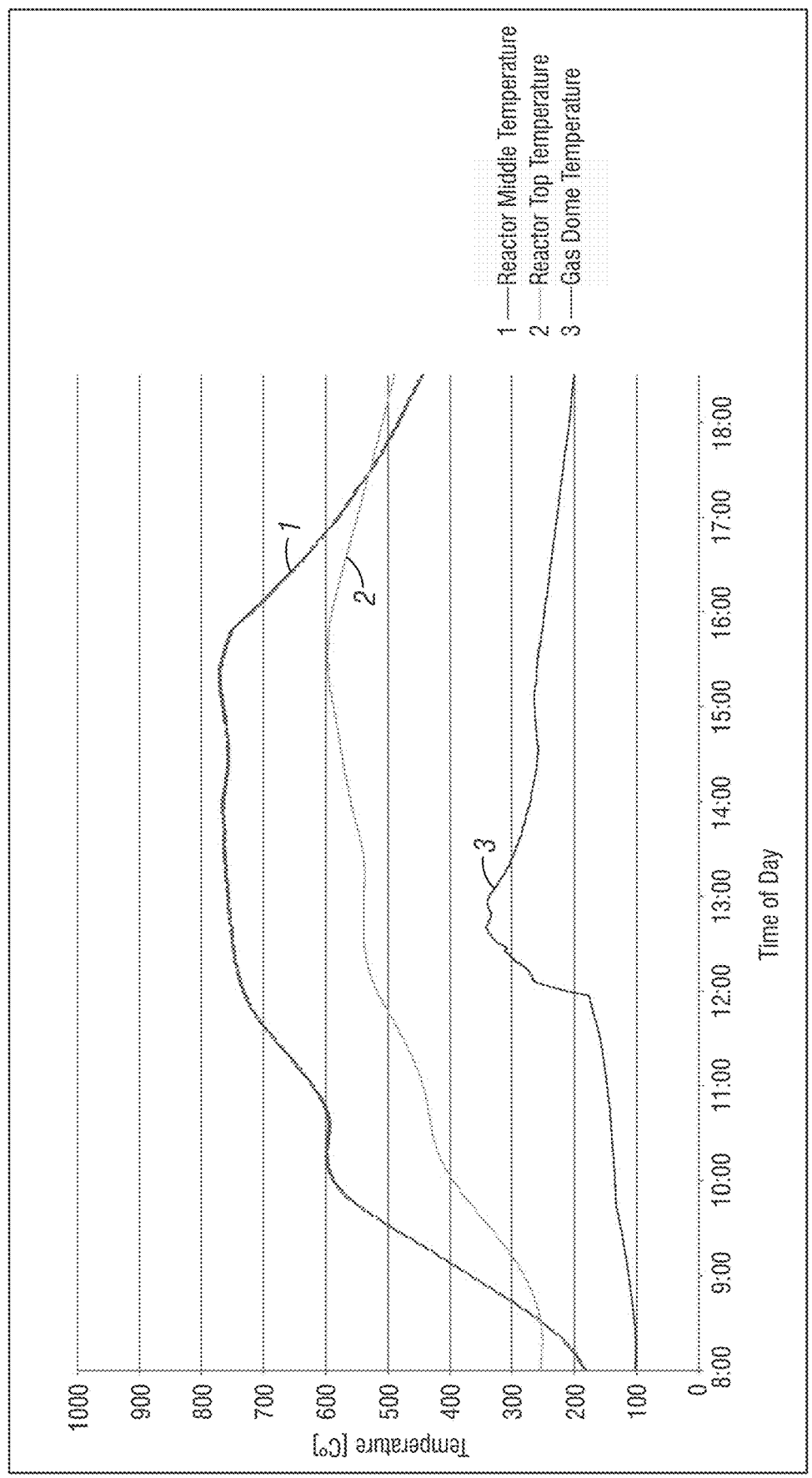
FIG. 11 shows temperature measurements from treated wood waste sources for producing biochar according to the methods, systems, and/or processes of the present invention.

Test Results:

FIGS. 9 and 11 show the temperature profiles in the reactor. These conditions were established to produce biochar formed at a range of temperatures from 600° C. to 800° C. (reactor middle temperature). In FIG. 9, the reactor middle temperature (line #1) was held at about 800° C. for high temperature-produced biochar. The temperature profiles in FIG. 11 show at least three plateaus ranging from 600° C. to 725° C. to 775° C.

Additional testing for pressure profiles, further analytical results and biochar analyses were further completed with test results not available at the time of filing.

Example 5

Evaluation of Pine/Wood Waste Feedstock Processing and Energy Content.

A comparison of the feedstock and outputs utilizing the thermolysis processing according to the invention is provided in Table 13.

TABLE 13

| Main components | Pine [Vol-%] | Ash [Vol-%] | Eucalyptus [Vol-%] | RR Ties (Oak) [Vol-%] |
|---|---|---|---|---|
| $H_2$ | 26.21 | 25.47 | 31.85 | 27.43 |
| $O_2$ | 0.46 | 0.31 | 0.35 | 0.35 |
| $N_2$ | 1.53 | 1.10 | 0.85 | 1.23 |
| $CH_4$ | 15.44 | 13.76 | 13.35 | 14.63 |
| $CO_2$ | 22.81 | 26.42 | 22.40 | 21.87 |
| CO | 28.91 | 28.37 | 27.30 | 30.10 |
| Ethane | 1.07 | 0.94 | 0.81 | 0.92 |
| Ethene | 3.13 | 3.20 | 2.70 | 3.09 |
| Propane | 0.03 | 0.02 | 0.02 | 0.02 |
| Propene | 0.43 | 0.42 | 0.36 | 0.36 |
| i-Butane | 0.00 | 0.00 | 0.00 | 0.00 |
| n-Butane | 0.00 | 0.00 | 0.00 | 0.00 |
| Total | 100 | 100 | 100 | 100 |
| $BTU/ft^3$ | 415 | 392 | 394 | 409 |

The variations in gas compositions for the different wood types was due to differences in plant operation. Overall, the average thermal energy content of the range of wood tested is 397 $Btu/ft^3$.

The various embodiments being thus described, it will be apparent that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method for converting a treated wood waste source to a Clean Fuel Gas and Biochar comprising:
inputting a treated wood waste source into a thermolysis system; wherein the thermolysis system comprises a primary reactor and at least a secondary reactor, said reactors having a process temperature between about 300° C.-1000° C., at least two gas scrubbers, an oil/water separator, and an oil/tar cracker; wherein the treated wood waste source comprises toxic compounds comprising inorganic and/or organic preservatives present in the waste source in an amount of at least 20 wt-%, wherein the inorganic and/or organic preservatives comprise one or more of creosote, chlorinated phenols, borates, copper, zinc, arsenic, chromium, pentachlorophenol (PCP), copper naphthenate, ammoniacal copper zinc, mixtures of coal tar oils, nitrides or other salts;
destroying and/or removing the toxic compounds in the waste source; and
generating outputs of the thermolysis system comprising Clean Fuel Gas and Biochar,
wherein the reactors generate tars and oils which are thereafter separated from the Clean Fuel Gas in the at least two gas scrubbers, thereafter, cracked in the oil/tar cracker, and sent back to the secondary reactor to generate more of the Clean Fuel Gas and no tars and oils remain in the outputs;
wherein the Clean Fuel Gas is substantially-free of halogenated organic compounds; and
wherein the Biochar is substantially-free of polycyclic aromatic hydrocarbons, dioxins and furans.

2. The method of claim 1, wherein the treated wood waste source comprises railroad ties, cross ties, RR crossing roadways, telephone poles, utility poles, cross arm members, bridge timbers, decking, walkways, dock timbers and wharf pilings, lake and ocean pier/pilings, landscaping timbers and edging, treated outdoor engineering structural and other reinforced wood composites, and/or other treated wood materials.

3. The method of claim 1, wherein the toxic compounds in the treated wood waste source comprise halogenated dibenzodioxins, halogenated dibenzofurans, biphenyls, pyrenes, arsenic, chlorofluorocarbons, or a combination thereof.

4. The method of claim 1, wherein the compounds destroyed comprise halogenated organic compounds, and wherein the method does not generate any toxic halogenated compounds in the process of converting the waste sources to the outputs.

5. The method of claim 1, wherein at least a portion of the Clean Fuel Gas source generated is provided back to the thermolysis system as a fuel source.

6. The method of claim 1, further comprising an initial step of shredding or grinding the waste source to provide a substantially uniform size of the waste source, and optionally comprising an additional step of grinding the Biochar to provide substantially uniform particles between about 1-80 mm for desired applications of use.

7. The method of claim 1, wherein the moisture content of the waste source is measured or the pressure in the reactor is measured and steam is injected into the reactor to increase moisture content of the waste source to about 5-20 wt-%, or the waste source is dried to decrease moisture content of the waste source to about 5-20 wt-%.

8. The method of claim 1, further comprising treating the Biochar with a dilute acid having a pH between about 1-6 in a holding tank to form a Biochar slurry for a period of time between 30 minutes and 6 hours, draining the acid solution from the tank, neutralizing the acidified Biochar with a mild base to precipitate chromium and/or arsenate contaminants from the Biochar, and separating the contaminants from the Biochar.

9. The method of claim 1 or claim 8, further comprising pelletizing the Biochar and activating the pelletized Biochar to increase the porosity by steam activation or chemical activation, wherein the pelletized Biochar has a porosity of at least about 200 $m^2$/gram following the activation step.

10. The method of claim 9, wherein between about 15-40% of the weight of the treated wood waste source is converted into the Biochar.

11. The method of claim 1, further comprising a first step of recovering creosote from treated wood waste sources comprising providing the treated wood waste source to a preheated chamber having a temperature between about 300-350° C. for at least a few minutes to evaporate creosote compounds, condensing and removing the vapors containing the creosote compounds before the treated wood waste source is inputted into the thermolysis system.

12. The Clean Fuel Gas and Biochar produced by the method of claim 1 containing less than about 10 ppb of toxic halogenated compounds.

13. The Clean Fuel Gas and Biochar of claim 1, substantially-free of any one or more chemical compounds found in creosote.

14. The Clean Fuel Gas of claim 13, comprising syngas and biofuel.

15. The Biochar produced by the method of claim 1 containing less than about 10 ppb of polycyclic aromatic hydrocarbons, dioxins and furans.

16. The Biochar of claim 15, wherein the Biochar is substantially-free or free of polychlorinated dibenzo-p-dioxins (PCDD) and polychlorinated dibenzofurans (PCDF) and has a porosity of at least about 200 $m^2$/gram.

17. A method of using the Biochar and/or Clean Fuel Gas produced by the method of claim 1 comprising:
(A) providing the Biochar as an input for use as a soil amendment, water treatment, filtration,
and/or other applications, and/or
(B) inputting the Clean Fuel Gas as a heat source.

18. The method of claim 17, wherein the Clean Fuel Gas is provided as a heat source for the reactors of the thermolysis system.

* * * * *